(12) United States Patent
Kim et al.

(10) Patent No.: US 12,284,629 B2
(45) Date of Patent: Apr. 22, 2025

(54) METHOD AND APPARATUS FOR SUPPORT OF CU-DU SPLIT IN MT-EDT PROCEDURE IN A WIRELESS COMMUNICATION SYSTEM BACKGROUND

(71) Applicant: LG Electronics Inc., Seoul (KR)

(72) Inventors: Seokjung Kim, Seoul (KR); Hyunjung Choe, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 17/636,555

(22) PCT Filed: Aug. 31, 2020

(86) PCT No.: PCT/KR2020/011636
§ 371 (c)(1),
(2) Date: Feb. 18, 2022

(87) PCT Pub. No.: WO2021/045464
PCT Pub. Date: Mar. 11, 2021

(65) Prior Publication Data
US 2022/0303946 A1 Sep. 22, 2022

(30) Foreign Application Priority Data
Sep. 6, 2019 (KR) .................. 10-2019-0110988

(51) Int. Cl.
*H04W 68/00* (2009.01)
*H04W 74/08* (2024.01)
*H04W 74/0833* (2024.01)
*H04W 76/20* (2018.01)

(52) U.S. Cl.
CPC ..... *H04W 68/005* (2013.01); *H04W 74/0833* (2013.01); *H04W 76/20* (2018.02)

(58) Field of Classification Search
CPC .............. H04W 68/005; H04W 76/20; H04W 74/0833
USPC ........................................................ 370/329
See application file for complete search history.

(56) References Cited

U.S. PATENT DOCUMENTS

2021/0219351 A1* 7/2021 Lin ..................... H04W 74/006

FOREIGN PATENT DOCUMENTS

WO    WO2019160282    8/2019

OTHER PUBLICATIONS

Intel Corporation, "Details on MT EDT for CP Solution (Msg2-based)," R2-1909545, revision of R2-1906435, 3GPP TSG RAN WG2 Meeting #107, Prague, Czech Republic, Aug. 26-30, 2019, 8 pages.

(Continued)

*Primary Examiner* — Gbemileke J Onamuti
(74) *Attorney, Agent, or Firm* — Fish & Richardson P.C.

(57) ABSTRACT

A method and apparatus for support of CU-DU split in MT-EDT procedure in a wireless communication system is provided. A Central Unit (CU) of a Radio Access Network (RAN node) receives, from a Distributed Unit (DU) of the RAN node, second information related to a transport block used for the wireless device. The CU decides a Radio Resource Control (RRC) state for transmitting the downlink (DL) data to the wireless device based on the first information related to the DL data and the second information related to the transport block.

20 Claims, 28 Drawing Sheets

(56) References Cited

OTHER PUBLICATIONS

Ericsson, "Support for CU-DU Split—F1 interface impact," R3-194166, 3GPP TSG RAN WG3 Meeting #105, Ljubljana, Slovenia, Aug. 26-30, 2019, 3 pages.
Huawei, "RACH optimization solution for NR," R3-194089, 3GPP TSG RAN3 Meeting #105, Ljubljana, Slovenia, Aug. 26-30, 2019, 5 pages.
Intel Corporation, "Details on MT EDT for CP Solution (Msg2-based)," R2-1909454, revision of R2-1906435, 3GPP TSG RAN WG2 Meeting #107, Prague, Czech Republic, Aug. 26-30, 2019, 8 pages.
ZTE, Sanechips, "Support of NR V2X in case of CU-DU split," R3-193647, 3GPP TSG RAN WG3 Meeting #105, Ljubljana, Slovenia, Aug. 26-30, 2019, 8 pages.

\* cited by examiner

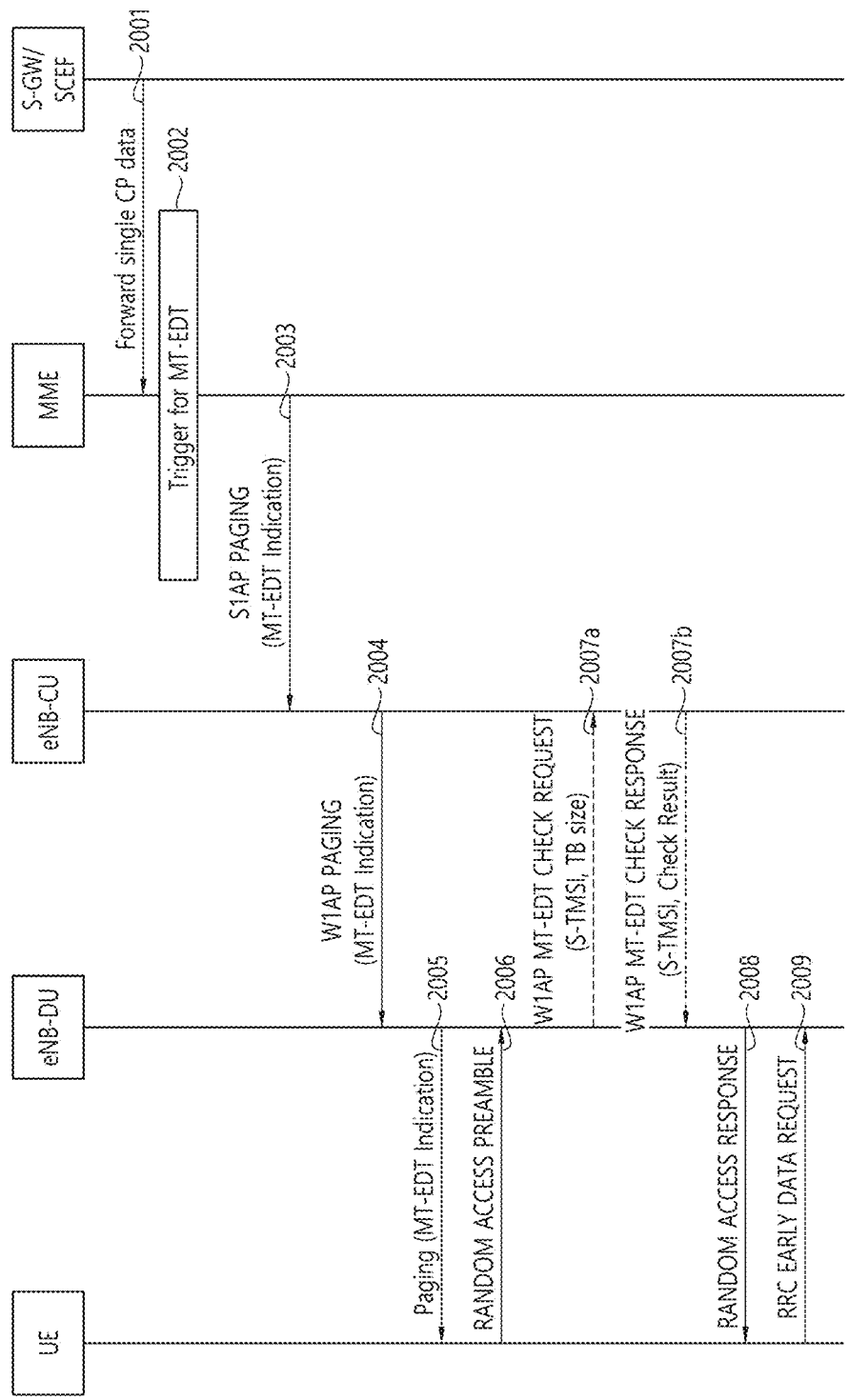

METHOD AND APPARATUS FOR SUPPORT OF CU-DU SPLIT IN MT-EDT PROCEDURE IN A WIRELESS COMMUNICATION SYSTEM BACKGROUND

CROSS-REFERENCE TO RELATED APPLICATIONS

This application is a National Stage application under 35 U.S.C. § 371 of International Application No. PCT/KR2020/011636, filed on Aug. 31, 2020, which claims the benefit of Korean Patent Application No. 10-2019-0110988, filed on Sep. 6, 2019. The disclosures of the prior applications are incorporated by reference in their entirety.

BACKGROUND

Technical Field

The present disclosure relates to a method and apparatus for support of CU-DU split in MT-EDT procedure in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state (or RRC idle state with suspend) is a new state added in 5G NR compare to 4G LTE. Motivation to use this state seems to reduce the time to bring user equipment (UE) in connected state from other states. This will increase UE battery life and latency as well because of less signaling involved. Both UE and gNB stores access stratum (AS) context in this state and bringing to RRC connected state from inactive state would not involve NAS level signaling.

In Rel-13, narrowband internet-of-things (NB-IoT) and LTE for machine-type communication (LTE-M) were standardized to provide wide-area connectivity for IoT. The technologies in Rel-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

A mechanism referred Mobile terminated (MT)-EDT has been studied for a data transmission triggered by a network. For example, a network may transmit downlink (DL) data to a wireless device via MT-EDT procedure.

SUMMARY

Technical Objects

There are two possible options for MT-EDT, which are message2 (Msg2)-based solution and message4 (Msg4)-based solution.

For example, a Mobility Management Entity (MME) may initiate the MT-EDT procedure based on the information from the serving-gateway (S-GW) and/or Service Capability Exposure Function (SCEF). The MME may indicate to an eNodeB (eNB) the initiation of the MT-EDT by using an S1AP PAGING message with a new indication. The eNB may forward the MT-EDT indication to the UE.

However, there is no consideration on how to support the MT-EDT for Central Unit (CU)-Distributed Unit (DU) split in an eNB and/or gNodeB (gNB).

In CU-DU split of the eNB or the gNB, the DU (for example, eNB-DU or gNB-DU) may host the Radio Link Control (RLC) layer, Medium Access Control (MAC) layer, and Physical (PHY) layer. The CU (for example, eNB-CU or gNB-CU) may host the Packet Data Convergence Protocol (PDCP) layer and Radio Resource Control (RRC) layer.

Thus, the DU only knows information on a transport block size for UE's CE level and the CU is only able to decide the RRC state for the UE.

Therefore, the studies for support of CU-DU split in MT-EDT procedure in a wireless communication system are needed.

Technical Solutions

In an aspect, a method performed by a Central Unit (CU) of a Radio Access Network (RAN) node in a wireless communication system is provided. The method includes receiving, from a Distributed Unit (DU) of the RAN node, second information related to a transport block used for the wireless device. The method further includes deciding a Radio Resource Control (RRC) state for transmitting the downlink (DL) data to the wireless device based on the first information related to the DL data and the second information related to the transport block.

In another aspect, an apparatus for implementing the above method is provided.

Technical Effects

The present disclosure may have various advantageous effects.

According to some embodiments of the present disclosure, a CU of a RAN node could efficiently support of CU-DU split in MT-EDT procedure in a wireless communication system.

For example, a CU could decide the exact RRC state based on the information from a DU and a core network node in Msg2-based MT-EDT procedure.

For other example, a CU could decide the exact RRC state based on the information from a DU and a core network node in Msg4-based MT EDT procedure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 20A and 20B show an example of a Msg4-based CP MT-EDT procedure in a wireless communication system according to some embodiments of the present disclosure.

DETAILED DESCRIPTION

Figure 1:
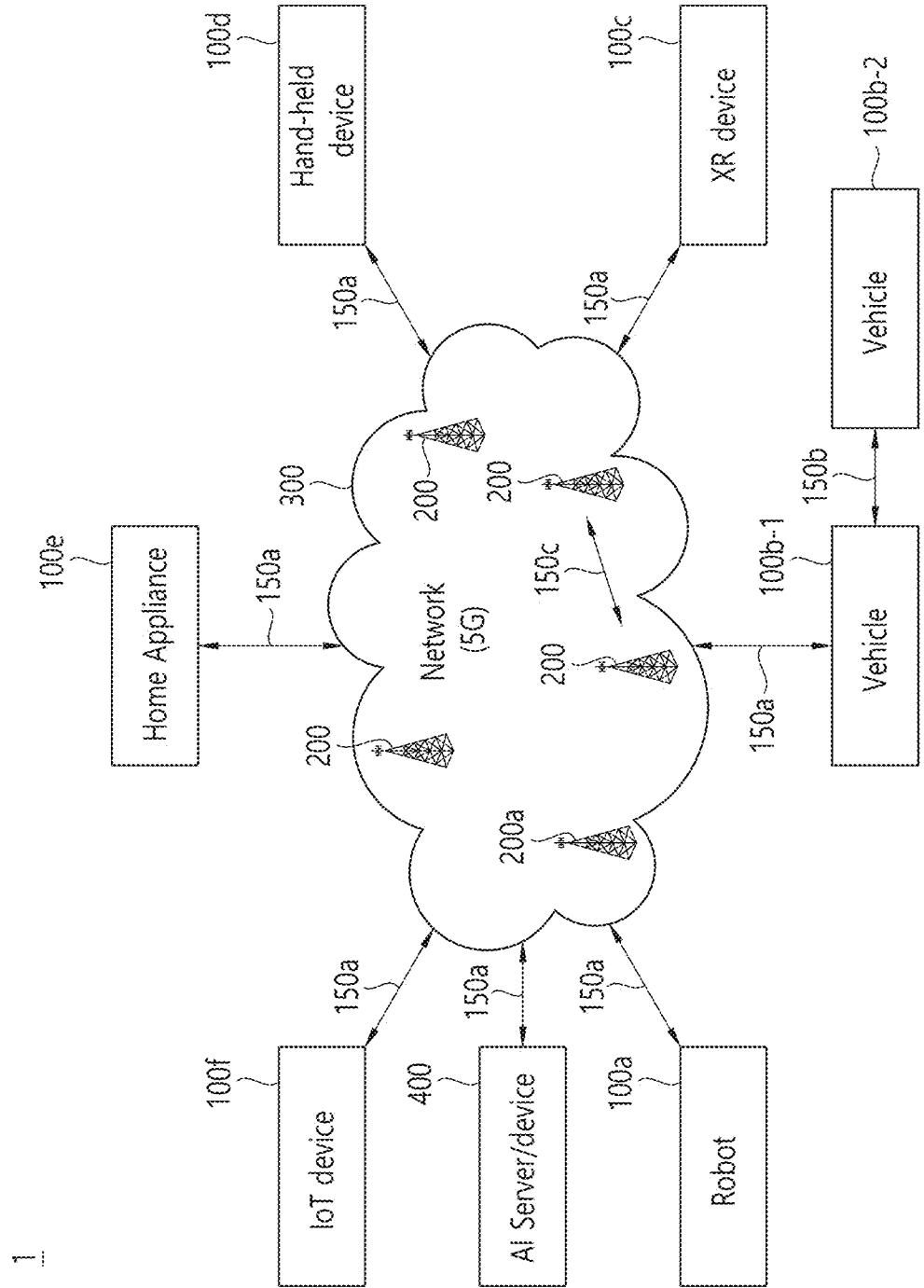
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
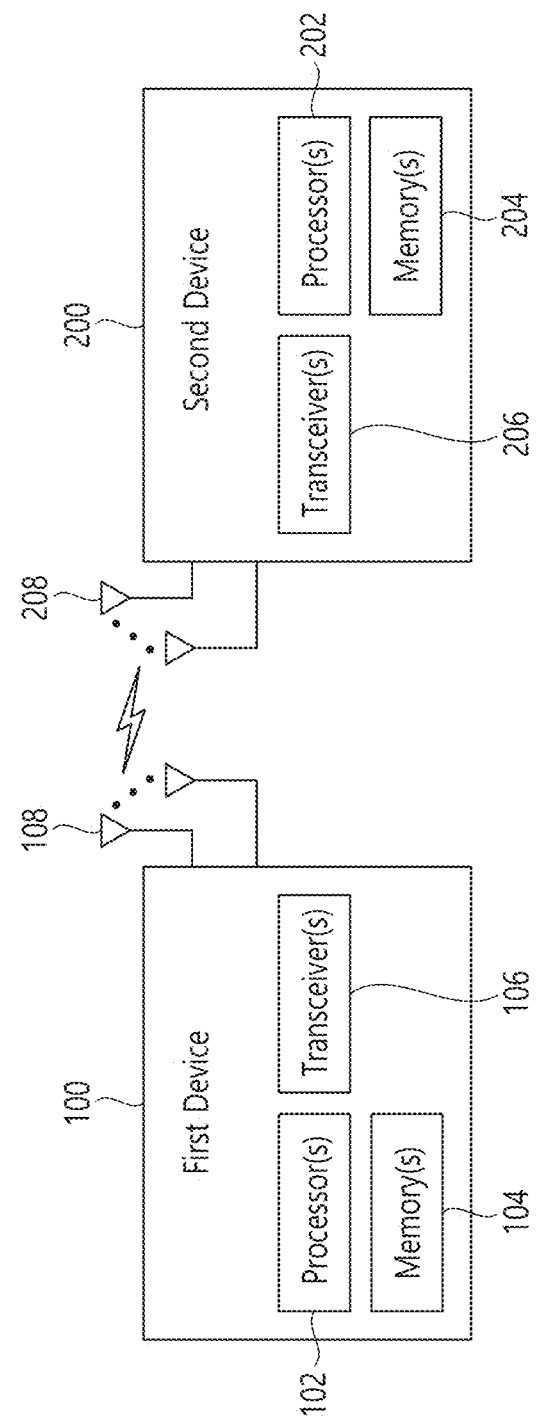
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/ signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
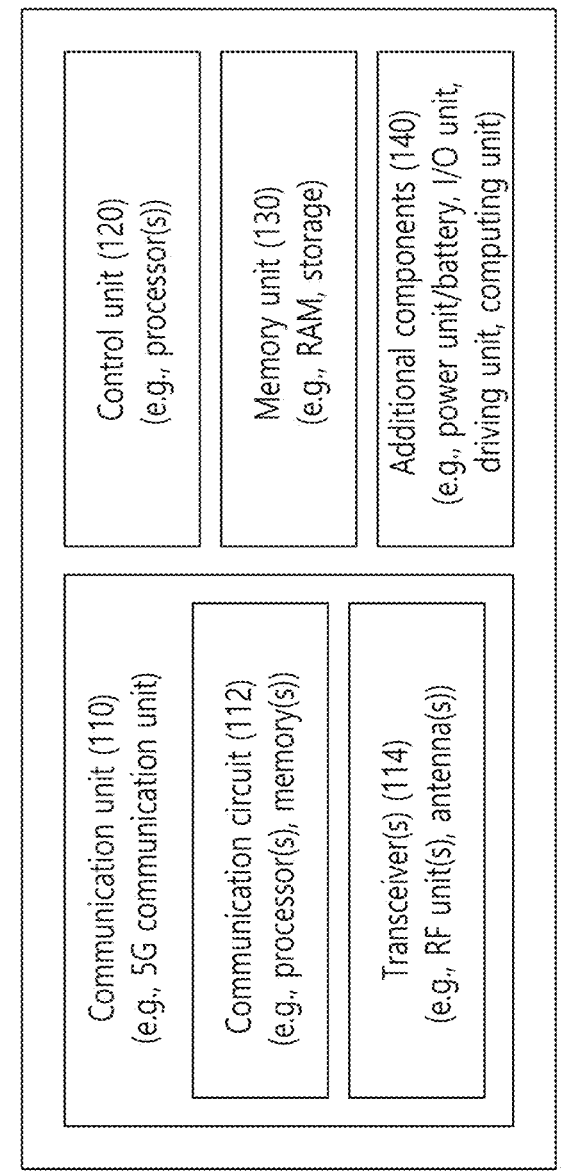
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
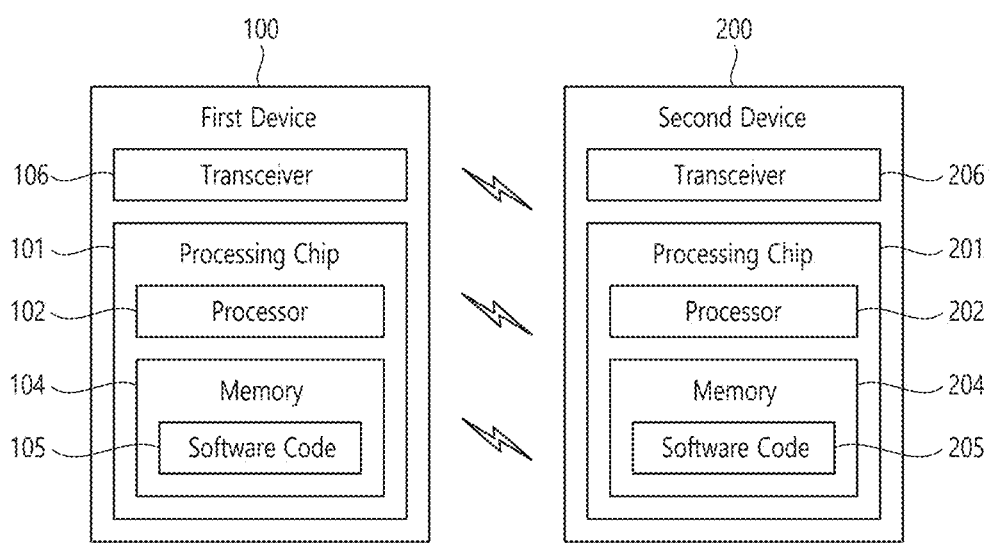
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
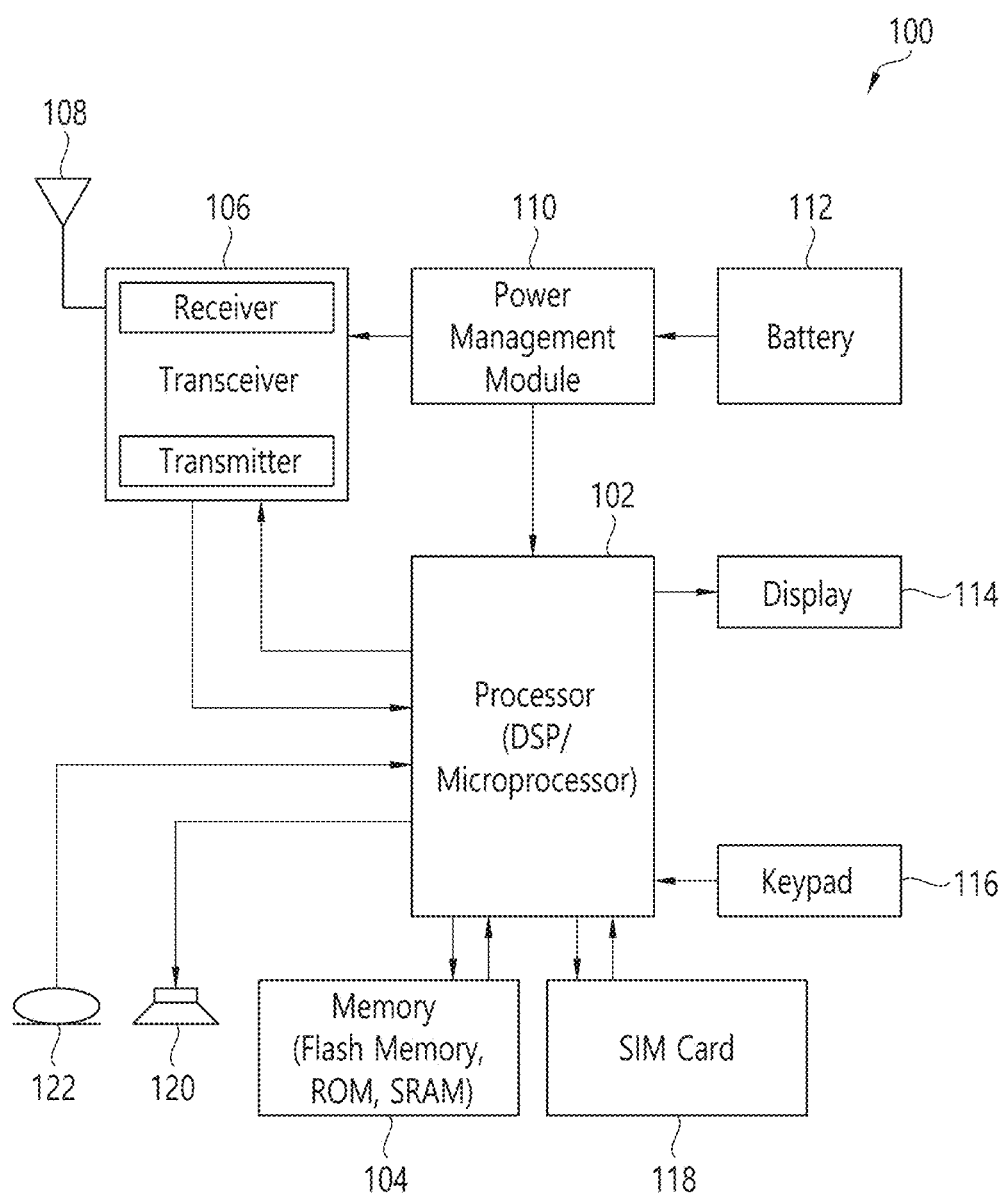
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
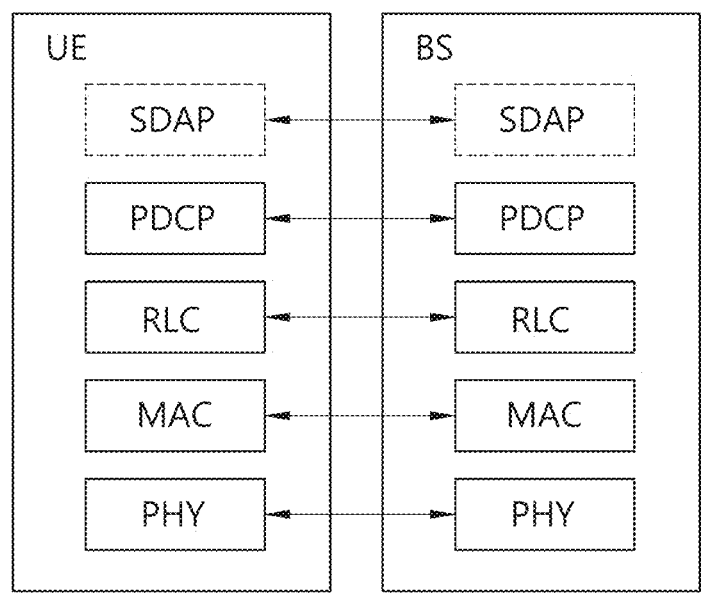
FIGS. 6 and 7 show an example of protocol stacks in a 3GPP based wireless communication system to which implementations of the present disclosure is applied.
Figure 7:
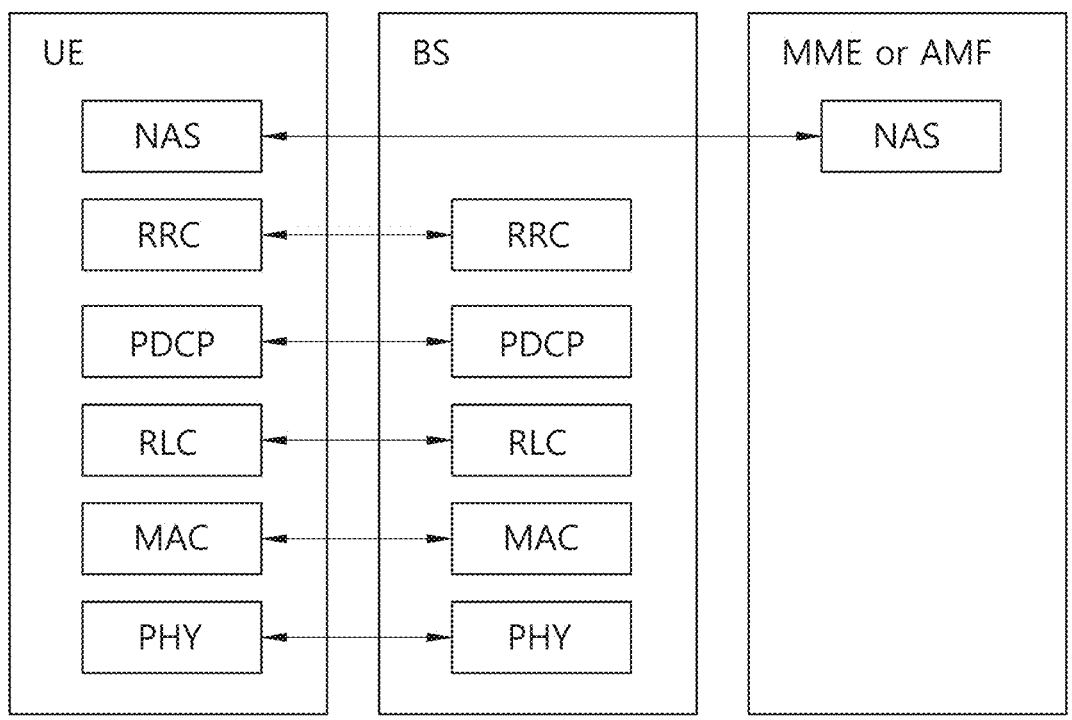

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels.

Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
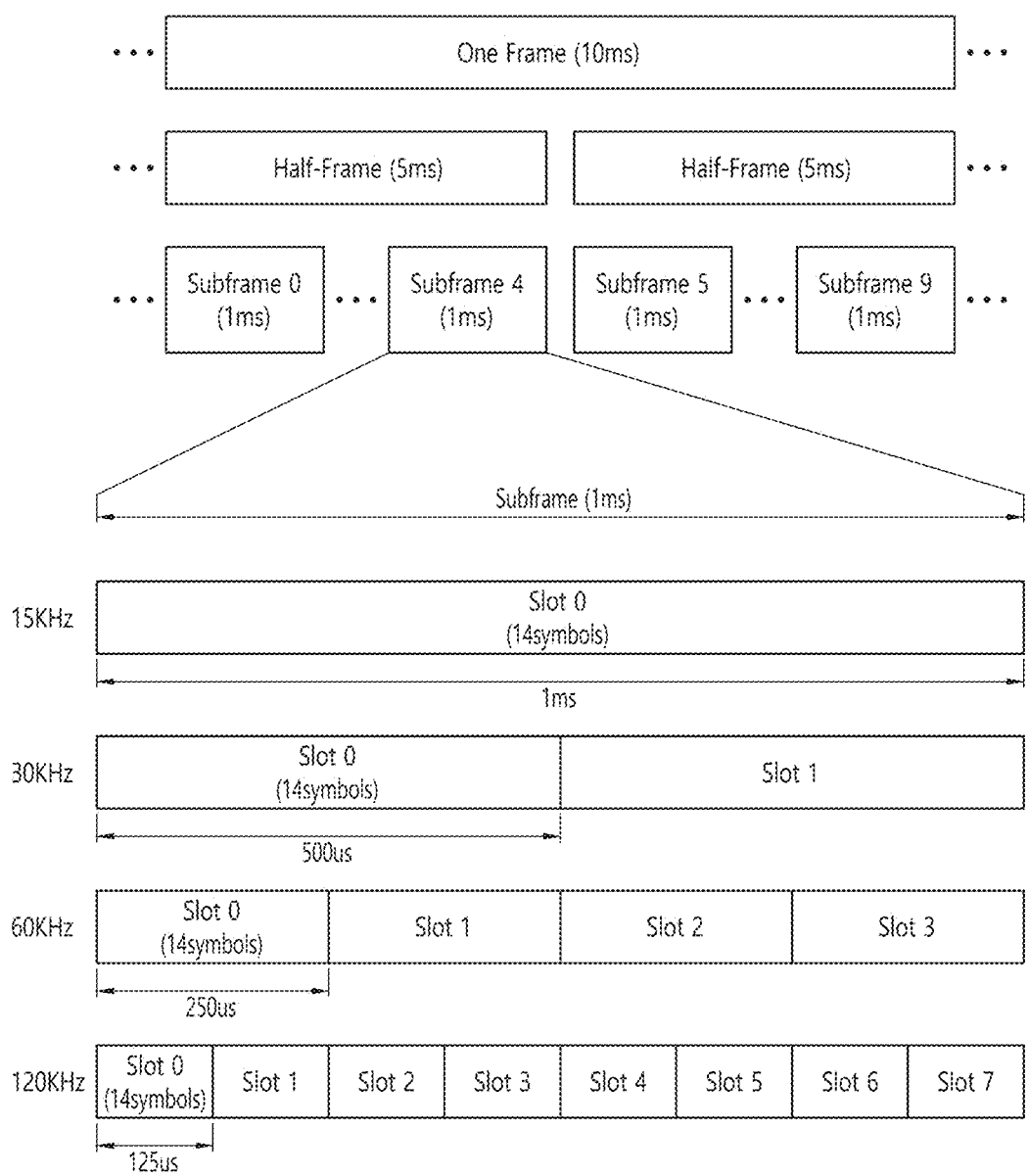
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
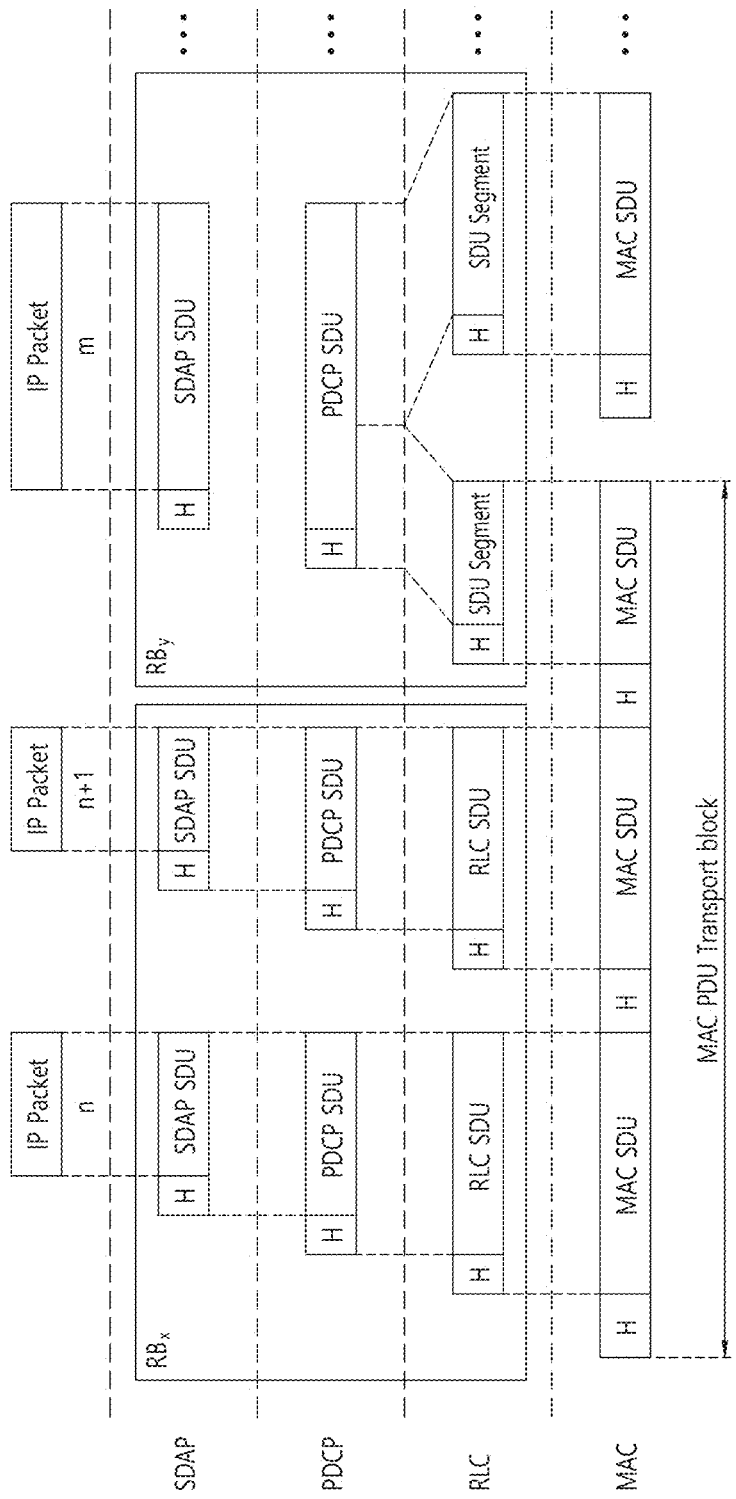
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
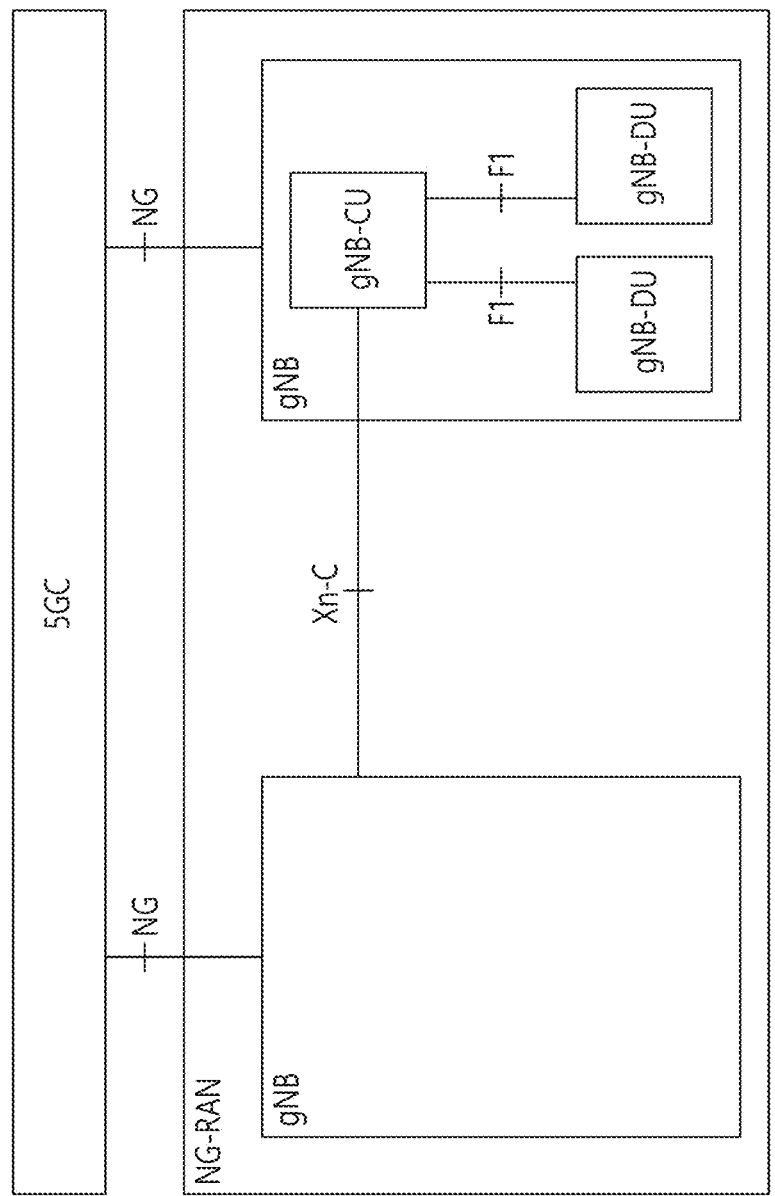
FIG. 10 shows an example of the overall architecture of an NG-RAN to which technical features of the present disclosure can be applied.

FIG. 10 shows an example of the overall architecture of an NG-RAN to which technical features of the present disclosure can be applied.

Referring to FIG. 10, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 11:
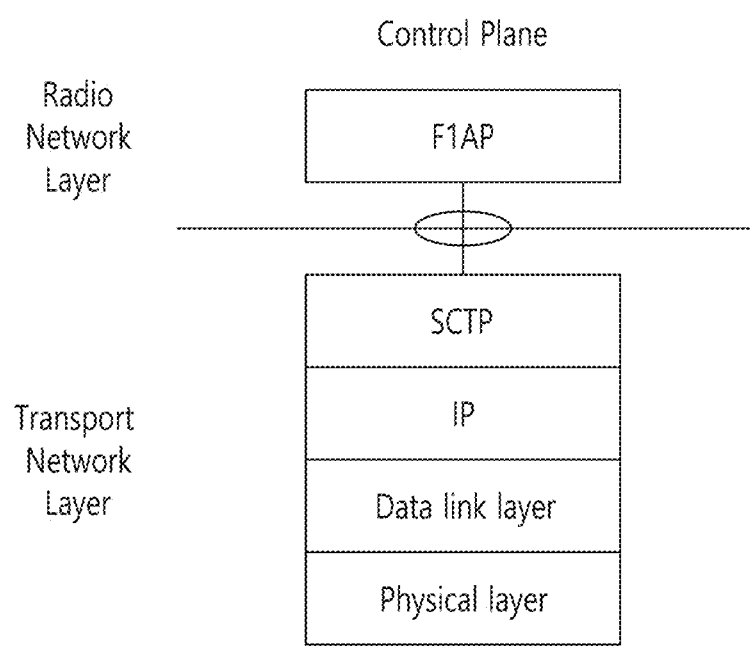
FIG. 11 shows an interface protocol structure for F1-C to which technical features of the present disclosure can be applied.

FIG. 11 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, EDT procedure is described. There are two types of EDT procedure, which are a Mobile Originated (MO)-EDT procedure and a Mobile Terminated (MT)-EDT procedure.

MO-EDT allows one uplink data transmission optionally followed by one downlink data transmission during the random access procedure.

MO-EDT is triggered when the upper layers have requested the establishment or resumption of the RRC Connection for Mobile Originated data (i.e., not signalling or SMS) and the uplink data size is less than or equal to a TB size indicated in the system information.

MT-EDT is intended for a single downlink data transmission during the random access procedure.

MT-EDT is initiated by the MME if the UE and the network support MT-EDT and there is a single DL data transmission for the UE.

There are two possible options for MT-EDT, which are message2 (Msg2)-based solution and message4 (Msg4)-based solution.

Figure 12:
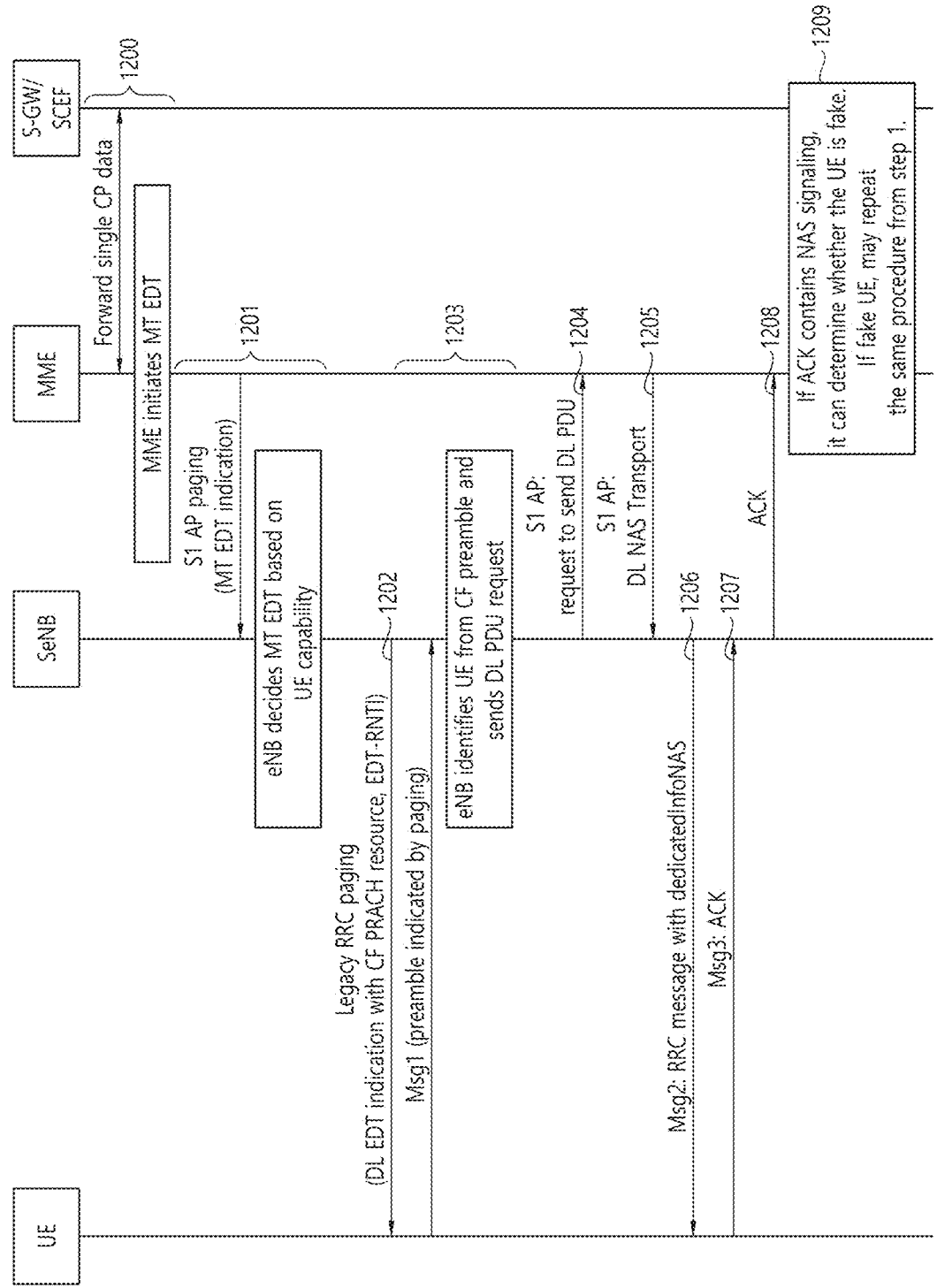
FIG. 12 shows an example scenario for a message2 (Msg2)-based control plane (CP) MT-EDT to which technical features of the present disclosure can be applied.

FIG. 12 shows an example scenario for a message2 (Msg2)-based control plane (CP) MT-EDT to which technical features of the present disclosure can be applied.

In step 1200, a serving-gateway (S-GW) and/or a Service Capability Exposure Function (SCEF) may forward, to a Mobility Management Entity (MME), a single CP data.

A MME may initiate an MT-EDT procedure upon receiving the single CP data. For example, the MME may initiate the MT-EDT procedure based on information related to the single CP data.

In step 1201, the MME may transmit, to a base station (for example, an eNB or a gNB), an S1AP paging message. For example, the S1AP paging message may include an MT-EDT indication, which indicates that the MT-EDT procedure is initiated by the MME.

The eNB may decides whether to perform the MT-EDT procedure based on UE capability.

In step 1202, the eNB may transmit, to a UE, an RRC paging message. For example, the RRC paging message may include downlink (DL) EDT indication with Contention Free (CF) Physical Random Access Channel (PRACH) resource. For example, the RRC paging message may include an EDT-Radio Network Temporary Identifier (RNTI).

In step 1203, the UE may transmit, to the eNB, a message 1 (Msg1) including preamble indicated by the paging.

The eNB may identify the UE from the CF preamble and determine whether to send a DL Protocol Data Unit (PDU) request.

In step 1204, the eNB may transmit, to the MME, the DL PDU request via the S1AP interface.

In step 1205, the eNB may receive, from the MME, the DL NAS transport message via the S1AP interface.

In step 1206, the eNB may transmit, to the UE, a message2 (Msg2). For example, the Msg2 may be an RRC message including the single CP data or the DL PDU. For example, the Msg2 may include a DedicatedInfoNAS. For example, the DedicatedInfoNAS may be an information element (IE) which is used to transfer UE specific NAS layer information between the network and the UE.

According to some embodiments of the present discloser, the single CP data or the DL PDU may be included in the Msg2 as information in the DedicatedInfoNAS.

In step 1207, the eNB may receive, from the UE, a message3 (Msg3). For example, the Msg3 may be an acknowledgement (ACK) in response to the Msg2.

In step 1208, the eNB may forward, the ACK to the MME.

In step 1209, the MME may determine whether to transmit the single CP data based on the received ACK.

For example, if the ACK contains NAS signalling, MME may be able to determine whether the UE is fake or not. If the MME determines that the UE is fake, the MME may repeat the same procedure from step 1201 to step 1209.

Figure 13:
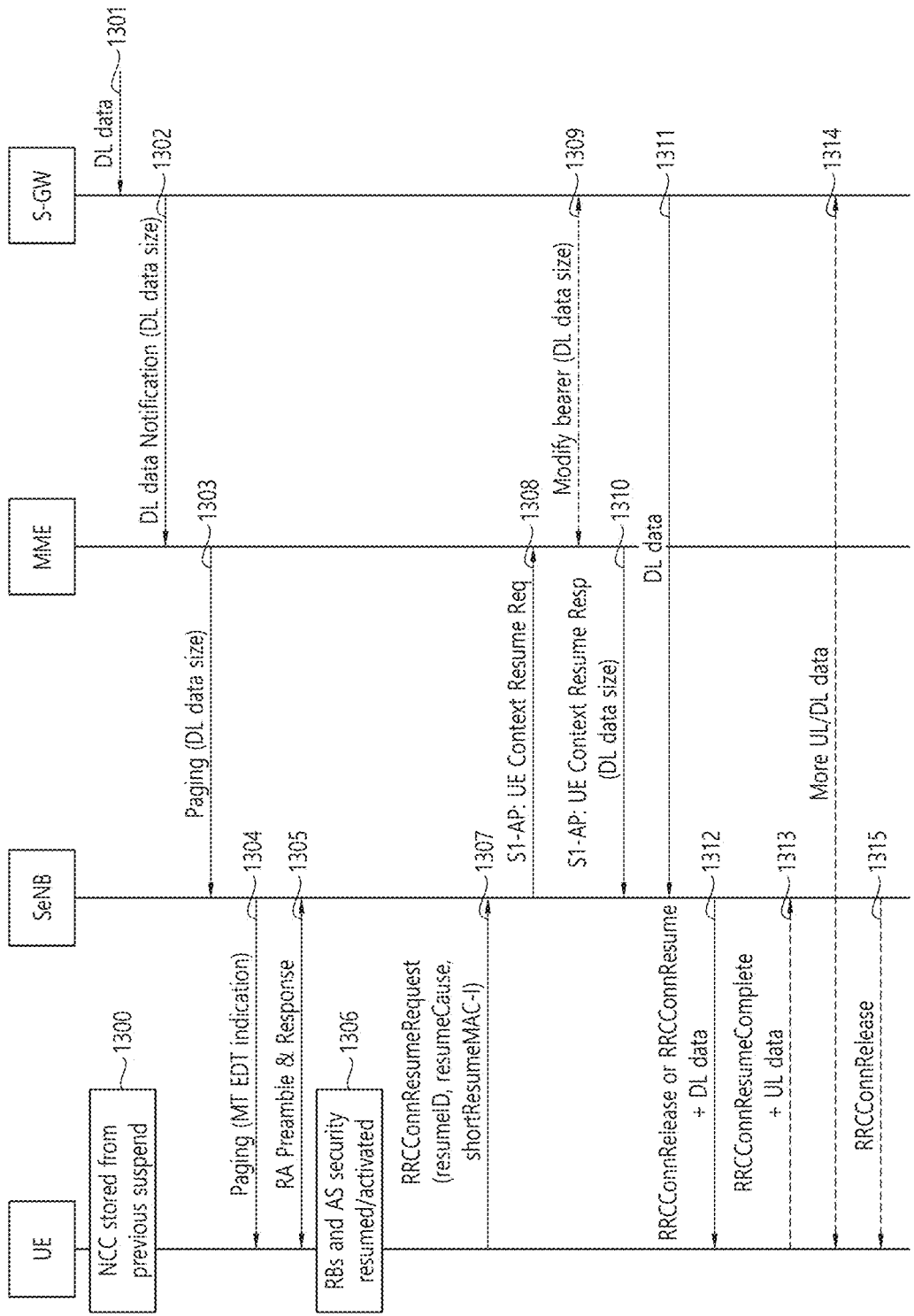
FIG. 13 shows an example scenario for a message4 (Msg4)-based user plane (UP) MT-EDT to which technical features of the present disclosure can be applied.

FIG. 13 shows an example scenario for a message4 (Msg4)-based user plane (UP) MT-EDT to which technical features of the present disclosure can be applied.

In step 1300, a UE may store a Next Hop (NH) Chaining Count (NCC) parameter. For example, the NCC parameter may be stored from previous suspend.

In step 1301, an S-GW may receive, from a core network, a DL data.

In step 1302, the S-GW may transmit, to an MME, a DL data notification including the DL data size.

In step 1303, the MME may transmit, to a base station (for example, an eNB), a paging including the DL data size.

In step 1304, the eNB may transmit, to the UE, a paging with an MT-EDT indication.

In step 1305, the eNB may receive an RA preamble from the UE and transmit a response to the UE.

In step 1306, the UE may resume or activate Radio Bearers (RBs) and Access Stratum (AS) security.

In step 1307, the UE may transmit, to the eNB, an RRC Connection Resume Request. For example, the RRC Connection Resume Request may include a resume ID, a resume cause, and/or a short Resume MAC-I.

In step 1308, the eNB may transmit, to the MME, a UE Context Resume Request via S1-AP interface.

In step 1309, the MME may transmit, to the S-GW, bearer information (for example, a modified bearer) and receives, from the S-GW, a DL data size.

In step 1310, the MME may transmit, to the eNB, a UE Context Resume Response via the S1-AP interface. For example, the UE Context Resume Response may include the DL data size.

In step 1311, the S-GW may transmit, to the eNB, the DL data.

In step 1312, the eNB may transmit, to the UE, an RRC Connection Release message or an RRC Connection Resume message. For example, the RRC Connection Release message or the RRC Connection Resume message may include the DL data.

In step 1313, the UE may transmit, to the eNB, an RRC Connection Resume Complete message. For example, if the UE has uplink (UL) data to be transferred, the UE may include the UL data to the RRC Connection Resume Complete message.

In step 1314, the UE may transmit, to the S-GW, more UL data and receives, from the S-GW, more DL data.

In step 1315, the UE may receive, from the eNB, an RRC Connection Release message.

Meanwhile, as described in FIGS. 12 and 13, the MME may initiate the MT-EDT procedure based on the information from the S-GW/SCEF, and then indicate to the eNB the initiation of the MT-EDT by using the S1AP PAGING message with a new indication. The eNB may forward the MT-EDT indication to the UE.

However, for the CU-DU split in eNB, there is no consideration on how to support the MT-EDT in two possible options. In CU-DU split of the eNB or the gNB, the DU (for example, eNB-DU or gNB-DU) may host the Radio Link Control (RLC) layer, Medium Access Control (MAC) layer, and Physical (PHY) layer. The CU (for example, eNB-CU or gNB-CU) may host the Packet Data Convergence Protocol (PDCP) layer and Radio Resource Control (RRC) layer.

Thus, the DU only knows the exact transport block size for UE's CE level and the CU is only able to decide the RRC state for the UE. Therefore, the CU and DU need to exchange the additional information to efficiently support the MT-EDT for the UE.

Therefore, the studies for support of CU-DU split in MT-EDT procedure in a wireless communication system are needed.

Hereinafter, a method for support of CU-DU split in MT-EDT procedure in a wireless communication system, according to some embodiments of the present disclosure, will be described.

Figure 14:
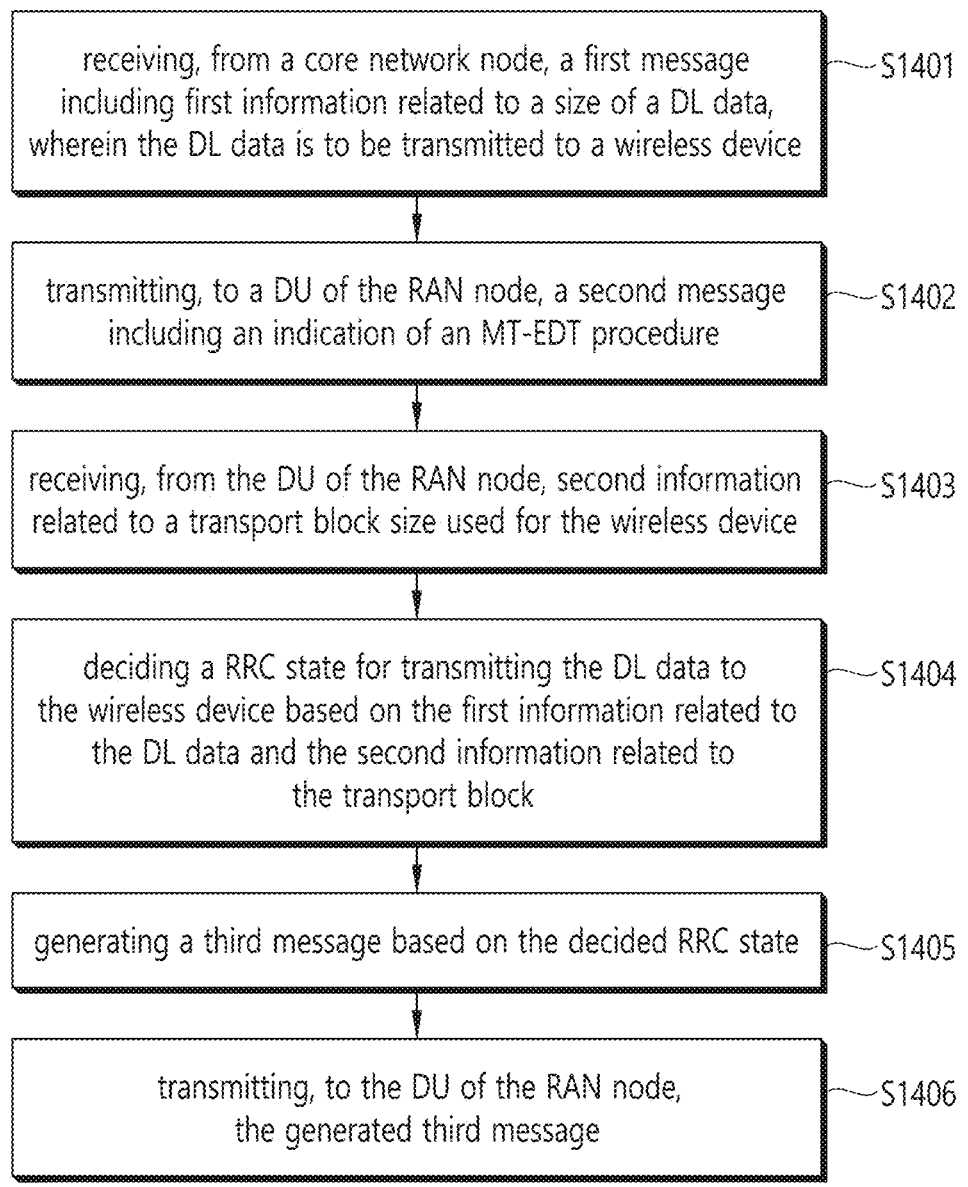
FIG. 14 shows an example of a method for support of CU-DU split in MT-EDT procedure in a wireless communication system.

FIG. 14 shows an example of a method for support of CU-DU split in MT-EDT procedure in a wireless communication system.

In particular, FIG. 14 shows an example of a method performed by a Central Unit (CU) of a Radio Access Network (RAN) node in a wireless communication system. For example, the RAN node may be connected to a core network node in the wireless communication system.

For example, the RAN node may include a Distributed Unit (DU) connected to the CU.

In step 1401, the CU may receive, from the core network node, a first message including first information related to a size of a downlink (DL) data. For example, the DL data may be to be transmitted to a wireless device.

For example, the RAN node may be an eNodeB (eNB). In this case, the first paging message may be an S1AP paging message.

For another example, the RAN node may be a gNodeB (gNB). In this case, the first paging message may be an NGAP paging message.

For example, the first information related to the DL data may include a size of the DL data. For example, the CU of the RAN node may receive the exact value of the DL data (for example, in terms of 'bytes').

For another example, the first information related to the DL data may include a size level of the DL data. The size level of the DL data may include a maximum size of the DL data and a minimum size of the DL data.

For example, the maximum size and the minimum size of the size level may be determined based on the quantized size of the transport block (TB). If the TB size to be allocated to the wireless device is 100, 200, or 300 (bytes), the size level of the DL data could be determined as a first level from 0 to 100, a second level from 100 to 200, and a third level from 200 to 300.

In step 1402, the CU may transmit, to a Distributed Unit (DU) of the RAN node, a second message including an indication of an MT-EDT procedure.

According to some embodiments of the present disclosure, the second message may include the size of the DL data. For example, the second message may include the indication of the MT-EDT procedure and the size of the DL data. For other example, the second message may include the size of the DL data instead of the indication of the MT-EDT procedure.

In step 1403, the CU may receive, from the DU of the RAN node, second information related to a transport block used for the wireless device.

For example, the second information related to the transport block may include a size of the transport block.

According to some embodiments of the present disclosure, a MAC layer of the DU of the RAN node may determine the size of the transport block based on radio quality of the wireless device.

For example, the MAC layer may determine a Modulation and Coding Scheme (MCS) index for the wireless device and number of Physical Resource Block (PRB) to be allocated for the wireless device.

The MAC layer may determine the TB size based on the MCS index and the number of the PRB. For example, the DU may include a mapping information between the TB size, the MCS indexes, and the number of the PRB. The DU may decide the TB size based on the mapping information.

In step 1404, the CU may decide a Radio Resource Control (RRC) state for transmitting the DL data to the wireless device based on the first information related to the DL data and the second information related to the transport block.

According to some embodiments of the present disclosure, if the first information related to the DL data includes the size of the DL data, the CU may decide the RRC state for transmitting the DL data to the wireless device based on the size of the DL data and the size of the transport block.

For example, the CU of the RAN node may decide the RRC state as an RRC-IDLE state with suspend based on that the size of the DL data is less than or equal to the size of the transport block.

For example, the CU of the RAN node may decide the RRC state as an RRC-CONNECTED state based on that the size of the DL data is greater than the size of the transport block.

According to some embodiments of the present disclosure, if the first information related to the DL data includes the size level of the DL data, the CU may decide the RRC state for transmitting the DL data to the wireless device based on the size level of the DL data and the size of the transport block.

For example, the CU of the RAN node may decide the RRC state as an RRC-IDLE state with suspend based on that the maximum size of the DL data is less than or equal to the size of the transport block.

For example, the CU of the RAN node may decide the RRC state as an RRC-CONNECTED state based on that the maximum size of the DL data is greater than the size of the transport block.

In step 1405, the CU may generate a third message based on the decided RRC state.

In step 1406, the CU may transmit, to the DU of the RAN node, the generated third message.

According to some embodiments of the present disclosure, the third message may include an RRC Connection Release message for the wireless device, based on that 1) the CU of the RAN node decides the RRC state as an RRC-IDLE state with suspend and 2) there is no uplink data from the wireless device.

For example, the third message may include the DL data. In this case, the wireless device may receive the DL data via the third message and return to the RRC-IDLE state with suspend.

According to some embodiments of the present disclosure, the third message may include an RRC Early Data Complete message for the wireless device, based on that 1) the CU of the RAN node decides the RRC state as an RRC-IDLE state with suspend and 2) there is a single uplink data from the wireless device.

For example, the third message may include the DL data, an uplink (UL) grant, and Timing Alignment (TA) information. The wireless device may transmit, to the DU of the RAN node, the single uplink data based on the UL grant and the TA information.

According to some embodiments of the present disclosure, the third message may include an RRC Connection Resume message for the wireless device, based on that the CU of the RAN node decides the RRC state as an RRC-CONNECTED state.

For example, the third message may not include the DL data. Then, the DL data may be transmitted to the wireless device after resuming the RRC connection.

For another example, the third message may include a part of the DL data. Then, the rest part of the DL data may be transmitted to the wireless device after resuming the RRC connection.

Hereinafter, an example of a method for support of CU-DU split in Msg2-based CP MT-EDT procedure in a wireless communication system, according to some embodiments of the present disclosure, will be described.

In this example, the DU may indicate, to the CU, the transport block (TB) size. The received TB size may be used, by the CU, for deciding whether the MT-EDT procedure is triggered or not.

When the CU decides not to trigger the MT-EDT procedure, the CU may request to the DU to send a Random Access Response message. The DU may send the Random Access Response message to a UE for transition to the RRC-CONNECTED state or the RRC-IDLE state.

Figure 15A:
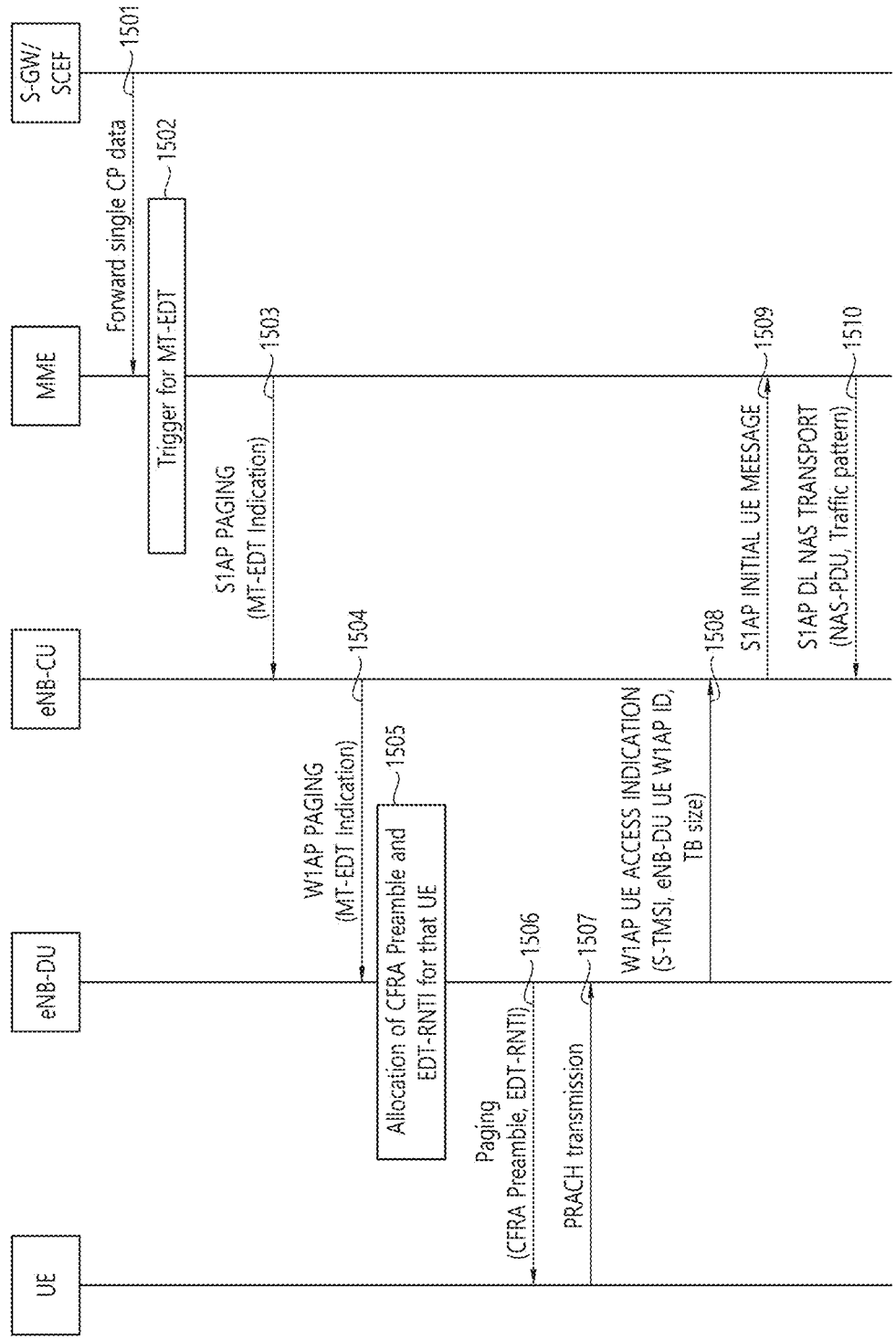
FIGS. 15A and 15B show an example of a procedure for Msg2-based CP MT-EDT in a wireless communication system according to some embodiments of the present disclosure.
Figure 15B:
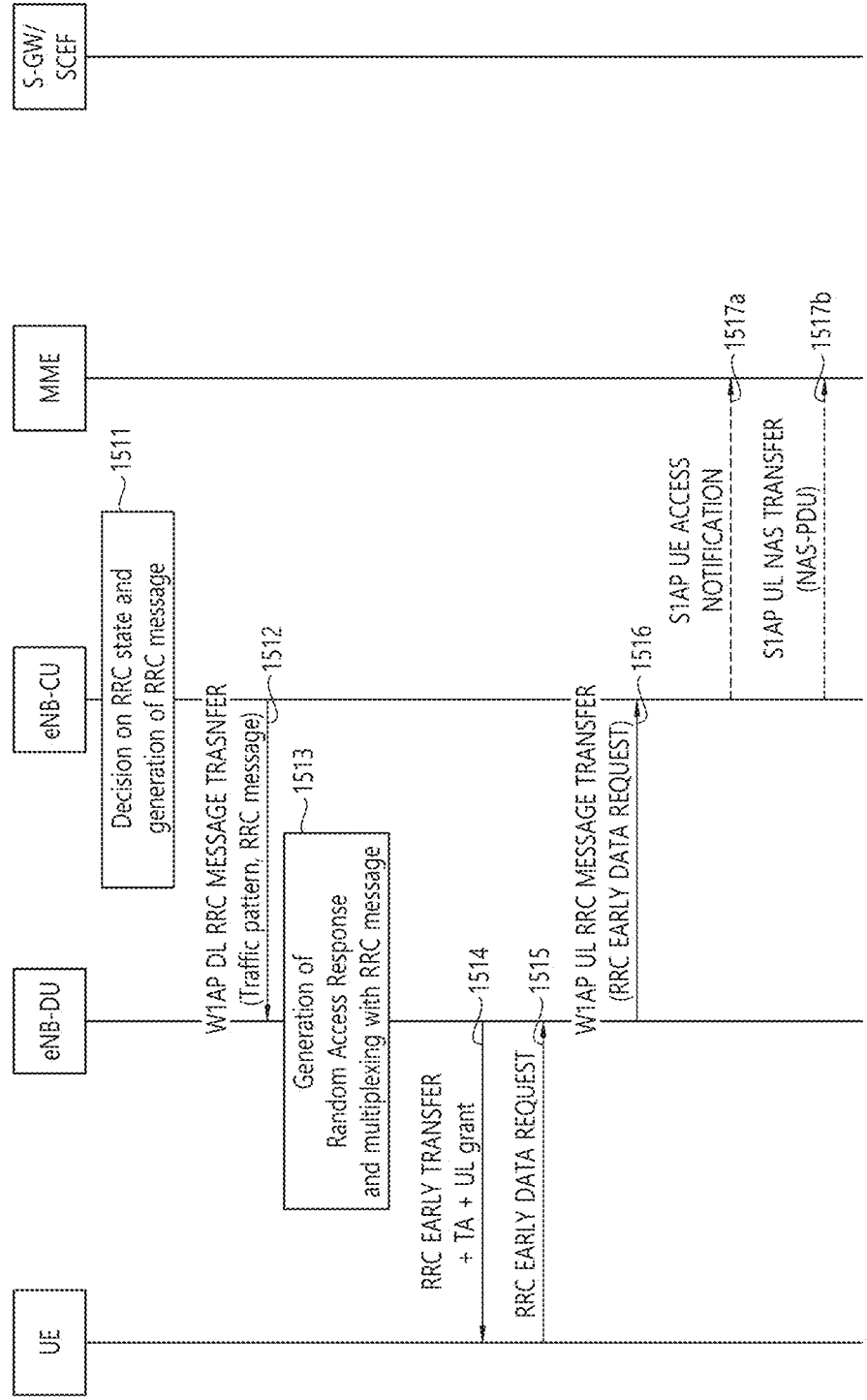

FIGS. 15A and 15B show an example of a procedure for Msg2-based CP MT-EDT in a wireless communication system according to some embodiments of the present disclosure.

For example, FIGS. 15A and 15B represent a wireless communication system including a UE, an eNB-DU, an eNB-CU, an MME, and an S-GW or a SCEF.

In step 1501, the S-GW or the SCEF may forward a single CP data to the MME. For example, when the S-GW or the SCEF receives, from a core network, the single CP data to be transmitted to the UE, the S-GW or the SCEF may forward a single CP data to the MME.

In step 1502, when the MME decides that the sing CP data (for example, a DL data) can be transmitted using MT-EDT procedure, the MME may initiate MT-EDT to send the DL data.

In step 1503, the MME may send, to the eNB-CU, an S1AP PAGING message including an MT-EDT indication. The MT-EDT indication may inform that the DL data could be transmitted using the MT-EDT procedure. If a size of the DL data is provided in the S1AP PAGING message, the S1AP PAGING message may not include the MT-EDT indication.

In step 1504, the eNB-CU may send, to the eNB-DU, a W1AP PAGING message including an MT-EDT indication. The MT-EDT indication may inform that the DL data could be transmitted using the MT-EDT procedure. Based on the indication, the eNB-DU may be also aware of initiating the Msg2-based MT-EDT solution.

If the size of the DL data is provided in the W1AP PAGING message, the W1AP PAGING message may not include the MT-EDT indication.

To uniquely identify the UE association over the W1 interface within the eNB-CU, the eNB-CU UE W1AP ID may be included into the W1AP PAGING message.

In step 1505, when the eNB-DU receives the MT-EDT indication or the size of the DL data, the eNB-DU may allocate the Contention Free Random Access (CFRA) Preamble and EDT-Radio Network Temporary Identifier (RNTI) for MT-EDT. The CFRA preamble may be used for the UE to respond to the eNB for the PAGING message. In addition, the EDT-RNTI may be used to identify the UE in RANDOM ACCESS RESPONSE message.

In step 1506, the eNB-DU may send to the UE the Paging message including the CFRA Preamble and the EDT-RNTI.

In step 1507, upon reception of the Paging message, the UE may use the preamble indicated by the Paging which in turn is used by the network to locate the UE for MT-EDT.

When the UE sends the preamble indicated by the Paging, the eNB-DU may consider that the UE accesses to the eNB-DU for the Paging response.

If the DL data size is included into the W1AP PAGING message and the eNB-DU is able to know the actual CE level for the UE, the gNB-DU may decide whether the DL data can be transmitted using the MT-EDT.

In step 1508, the eNB-DU may send to the eNB-CU the W1AP UE ACCESS INDICATION message including the System Architecture Evolution (SAE)-Temporary Mobile Subscriber Identity (S-TMSI) and eNB-DU UE W1AP ID to inform that the UE accesses to the eNB-DU for the paging response and the MT-EDT. The S-TMSI may be used to identify the UE in the eNB-CU. If the eNB-CU UE W1AP ID is included into the W1AP PAGING message in step 1504, the eNB-CU UE W1AP ID may be also included into the W1AP UE ACCESS INDICATION message.

The eNB-DU UE W1AP ID may be used to identify the UE association over the W1 interface within the eNB-DU. If the eNB-DU is able to know the actual CE level for the UE based on the preamble sent by the UE, the transport block size may be included into the W1AP UE ACCESS INDICATION message.

Since multiple fake UEs (attackers) may respond to the paging message, the same eNB-CU UE W1AP ID received in step 1504 may be used to identify the UE in eNB-CU. In this case, the S-TMSI can be used to identify the UE in the eNB-CU.

In step 1509, based on the S-TMSI and/or the eNB-CU UE W1AP ID, the eNB-CU may be able to identify the UE. When the DL data size is smaller than the transport block size for the MT-EDT, the eNB-CU may send, to the MME, the S1AP INITIAL UE MESSAGE to indicate the UE's access and the request of delivery of the DL data.

In step 1510, the MME may send, to the eNB-CU, the S1AP DL NAS TRANSPORT message including the NAS-PDU with DL data. This message may also contain the traffic pattern to indicate whether there is no subsequent uplink and/or downlink data or not. This traffic pattern may be included into the S1AP PAGING message in step 1503.

In step 1511, based on the DL data size, traffic pattern, transport block size, and so on, the eNB-CU may decide the actual RRC state for the UE. If the eNB-CU decides to send back the UE to the RRC-IDLE with suspend and there is no uplink data from the UE, the eNB-CU may generate the RRC CONNECTION RELEASE message or new message including the NCC which is used for the next EDT. If the eNB-CU decides to send back the UE to the RRC-IDLE with suspend and there is a single uplink data from the UE, the eNB-CU may generate the RRC EARLY TRANSFER message or new message to deliver the DL data.

In step 1512, the eNB-CU may send to the eNB-DU the W1AP DL RRC MESSAGE TRANSFER message including the RRC message generated by the eNB-CU. This message may also contain the additional information (for example, traffic pattern, UE's expected behaviour, Release Assistance Information) to indicate whether there is no subsequent uplink and/or downlink data or not. This traffic pattern may be included into the W1AP PAGING message in step 1504. The eNB-CU may indicate to the eNB-DU the information on which RRC state is decided for the UE.

In step 1513, when the eNB-DU receives the message from the eNB-CU, the eNB-DU may generate the RANDOM ACCESS RESPONSE message including the Timing Alignment information and the UL grant. Then, this message may be multiplexed with the RRC message received in step 1512.

In step 1514, if there is a single uplink (UL) data from the UE, the eNB-DU may send to the UE the RANDOM ACCESS RESPONSE message multiplexed with RRC EARLY TRANSFER message.

In step 1515, the UE may respond to the eNB with the RRC EARLY DATA REQUEST message or new message. This message may contain the UL data.

In step 1516, the eNB-DU may forward to the eNB-CU the RRC EARLY DATA REQUEST message or new message by using the W1AP UL RRC MESSAGE TRANSFER message.

In step 1517a, if there is not the NAS-PDU containing the UL data, the eNB-CU may send the S1AP UE ACCESS NOTIFICATION message or new message to indicate that the MT-EDT is successfully delivered to the UE.

In step 1517b, if there is the NAS-PDU containing the UL data, the eNB-CU may send the S1AP UL NAS TRANSFER message to forward the NAS-PDU with UL data and to indicate that the MT-EDT is successfully delivered to the UE.

Figure 16A:
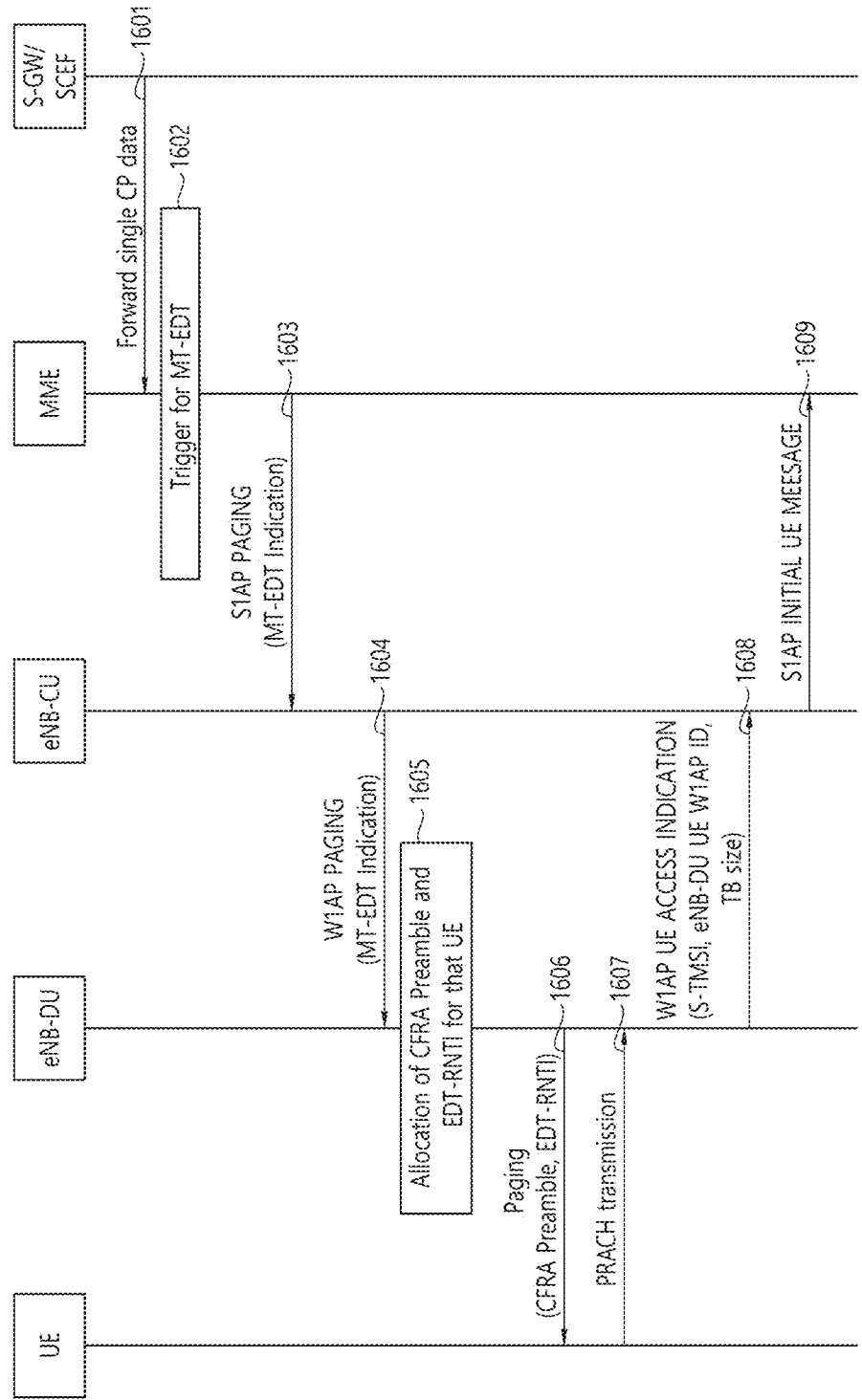
FIGS. 16A and 16B show an example of a procedure to handle the failure case in Msg2-based CP MT-EDT in a wireless communication system according to some embodiments of the present disclosure.
Figure 16B:
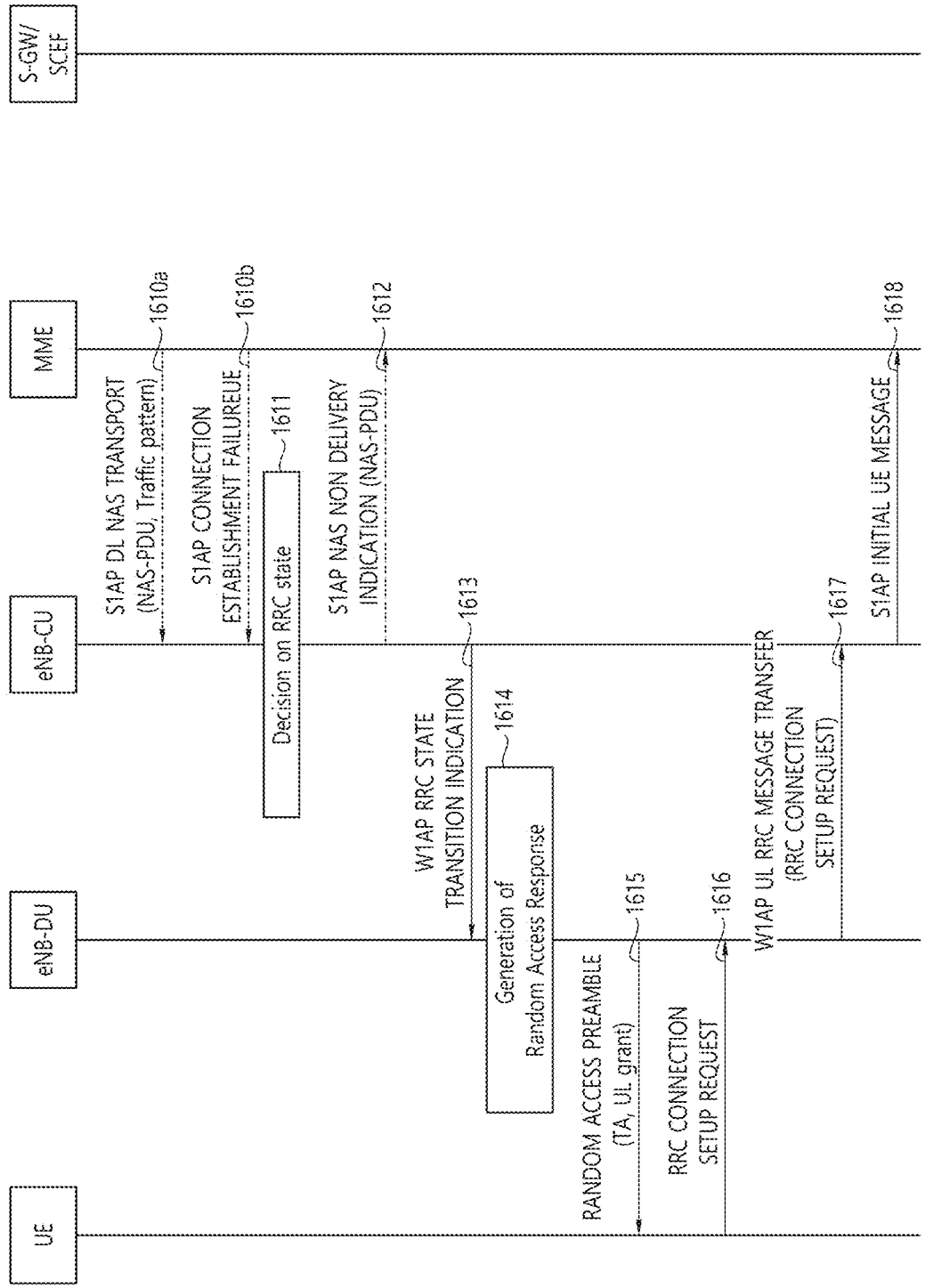

FIGS. 16A and 16B show an example of a procedure to handle the failure case in Msg2-based CP MT-EDT in a wireless communication system according to some embodiments of the present disclosure.

For example, FIGS. 16A and 16B represent a wireless communication system including a UE, an eNB-DU, an eNB-CU, an MME, and an S-GW/SCEF.

In step 1601, the S-GW or the SCEF may forward a single CP data to the MME. For example, when the S-GW or the SCEF receives, from a core network, the single CP data to be transmitted to the UE, the S-GW or the SCEF may forward a single CP data to the MME.

In step 1602, when the MME decides that a DL data can be transmitted using MT-EDT, the MME may initiate MT-EDT to send the DL data.

In step 1603, the MME may send the S1AP PAGING message including the MT-EDT indication to inform that the DL data can be transmitted using MT-EDT. If the DL data size is provided in the S1AP PAGING message, the S1AP PAGING message may not include the MT-EDT indication.

In step 1604, the eNB-CU may send the W1AP PAGING message including the MT-EDT indication to inform that the DL data can be transmitted using MT-EDT. Based on the MT-EDT indication, the eNB-DU can be also aware of initiating the Msg2-based MT-EDT solution.

If the DL data size is provided in the W1AP PAGING message, the W1AP PAGING message may not include the MT-EDT indication.

To uniquely identify the UE association over the W1 interface within the eNB-CU, the eNB-CU UE W1AP ID may be included into the W1AP PAGING message.

In step 1605, when the eNB-DU receives the MT-EDT indication or DL data size, the eNB-DU may allocate the CFRA Preamble and EDT-RNTI for MT-EDT. The CFRA preamble may be used for the UE to respond to the eNB for the PAGING message. In addition, the EDT-RNTI may be used to identify the UE in RANDOM ACCESS RESPONSE message.

In step 1606, the eNB-DU may send to the UE the Paging message including the CFRA Preamble and EDT-RNTI.

In step 1607, upon reception of the Paging message, the UE may use the preamble indicated by the Paging which in turn is used by the network to locate the UE for MT-EDT. When the UE sends the preamble indicated by the Paging, the eNB-DU may consider that the UE accesses to it for the Paging response.

According to the some embodiments of the present disclosure, if the DL data size is included into the W1AP PAGING message and the eNB-DU is able to know the actual CE level for the UE, the gNB-DU may decide whether the DL data can be transmitted using the MT-EDT.

In step 1608, the eNB-DU may send to the eNB-CU the W1AP UE ACCESS INDICATION message including the S-TMSI and eNB-DU UE W1AP ID to inform that the UE accesses to the eNB-DU for the paging response and MT-EDT. The S-TMSI may be used to identify the UE in the eNB-CU. If the eNB-CU UE W1AP ID is included into the W1AP PAGING message in step 1604, the eNB-CU UE W1AP ID may be also included into the W1AP UE ACCESS INDICATION message.

The eNB-DU UE W1AP ID may be used to identify the UE association over the W1 interface within the eNB-DU. If the eNB-DU is able to know the actual CE level for the UE based on the preamble sent by the UE, the transport block size may be included into the W1AP UE ACCESS INDICATION message.

Since multiple fake UEs (attackers) may respond to the paging message, the same eNB-CU UE W1AP ID received in step 1604 may be used to identify the UE in eNB-CU. In this case, the S-TMSI can be used to identify the UE in the eNB-CU.

In step 1609, based on the S-TMSI and/or the eNB-CU UE W1AP ID, the eNB-CU may be able to identify the UE. When the DL data size is smaller than the transport block size for the MT-EDT, the eNB-CU may send, to the MME, the S1AP INITIAL UE MESSAGE to indicate the UE's access and the request of delivery of the DL data.

In step 1610a, the MME may send the S1AP DL NAS TRANSPORT message including the NAS-PDU with DL data. This message may also contain the traffic pattern to indicate whether there is no subsequent uplink and/or downlink data or not. This traffic pattern may be included into the S1AP PAGING message in step 1603.

In step 1610b, if there is additional DL data to the UE or the MME determines that the UE need to enter into the RRC-CONNECTED state or RRC-IDLE state due to the MME generated reasons, the MME may send, to the eNB-CU, the S1AP CONNECTION ESTABLISHMENT FAILURE message or new message to indicate that the S1 connection establishment is failed due to some reasons. In this case, a cause value should be included to indicate the exact reason for the failure.

In step 1611, based on the DL data size, traffic pattern, transport block size, and so on, the eNB-CU may decide the actual RRC state for the UE. If the eNB-CU decides to send back the UE to the RRC-IDLE with suspend and there is no uplink data from the UE, the eNB-CU may generate the RRC CONNECTION RELEASE message or new message including the NCC which is used for the next EDT. If the eNB-CU decides to send back the UE to the RRC-CONNECTED, the eNB-CU may inform the eNB-DU of transiting to RRC-CONNECTED for the UE.

In step 1612, if the eNB-CU decides to send back the UE to the RRC-CONNECTED and there is a pending DL data received in step 1610, the eNB-CU may report the non-delivery of this NAS message by sending a S1AP NAS NON DELIVERY INDICATION message to the MME including the non-delivered NAS message and an appropriate cause value. For example, the cause value may be "State transition to RRC-CONNECTED due to MT-EDT Failure".

In step 1613, the eNB-CU may send to the eNB-DU the W1AP RRC STATE TRANSITION message to indicate to the eNB-DU the transition to RRC-CONNECTED for the UE.

In step 1614, the eNB-DU may generate the RANDOM ACCESS RESPONSE message or new message to indicate to the UE the transition to RRC-CONNECTED.

In step 1615, the eNB-DU may send to the UE the RANDOM ACCESS RESPONSE message. For example, the RANDOM ACCESS RESPONSE message may include Timing Alignment (TA) information and/or UL grant.

In step 1616, the UE may respond to the eNB with the RRC CONNECTION SETUP REQUEST message.

In step 1617, the eNB-DU may forward to the eNB-CU the RRC CONNECTION SETUP REQUEST message or new message by using the W1AP UL RRC MESSAGE TRANSFER message.

In step 1618, the eNB-CU may send the S1AP INITIAL UE MESSAGE to newly establish the S1 connection.

On the other hand, FIGS. 15 and 16 represent a method for support the MT-EDT procedure in CU-DU split for an eNB. However, it should be understood by those of ordinary skill in the art that the example of the method could be applied to the MT-EDT procedure in CU-DU split for the gNB. For example, the wireless communication system could include a gNB-DU, a gNB-CU, an Access and Mobility Management Function (AMF), and a 5G core network. For example, the gNB-DU may transmit, to the gNB-CU, the TB size and the gNB CU may decide whether to perform the MT-EDT procedure based on the received TB size.

Hereinafter, an example of a method for support of CU-DU split in Msg2-based UP MT-EDT procedure in a wireless communication system, according to some embodiments of the present disclosure, will be described.

In this example, the DU may indicate, to the CU, the transport block (TB) size. The received TB size may be used, by the CU, to decide whether the MT-EDT is triggered or not.

In addition, the DU may inform the CU of the DL UP TNL Information to deliver the DL data by using the MT-EDT. When the CU decides to fail the MT-EDT, the CU may request to the eNB-DU to send a RANDOM ACCESS RESPONSE message to transit to the RRC-CONNECTED or RRC-IDLE state.

Figure 17A:
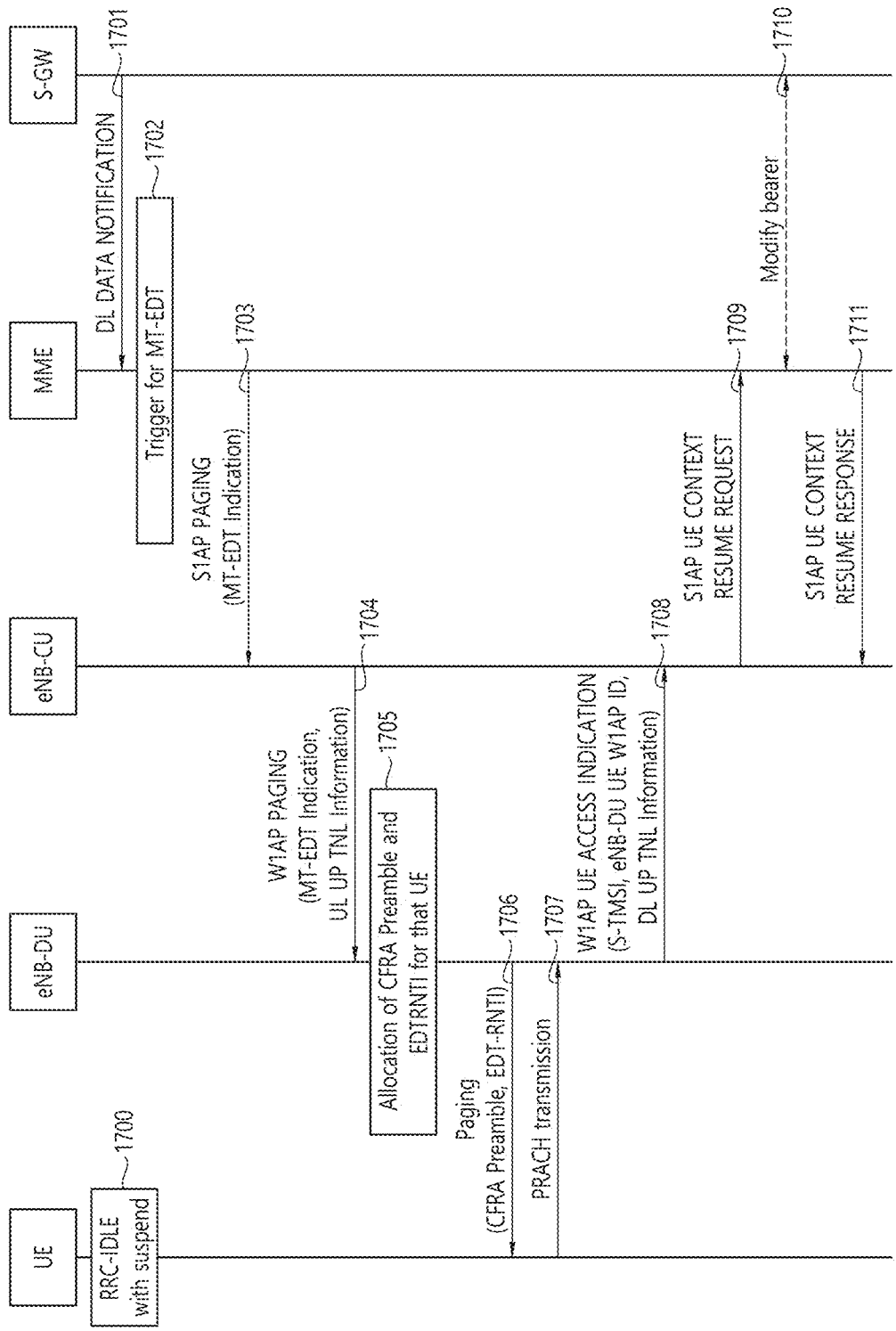
FIGS. 17A and 17B show an example of a procedure for Msg2-based UP MT-EDT without F1 UE Context Setup procedure in a wireless communication system according to some embodiments of the present disclosure.
Figure 17B:
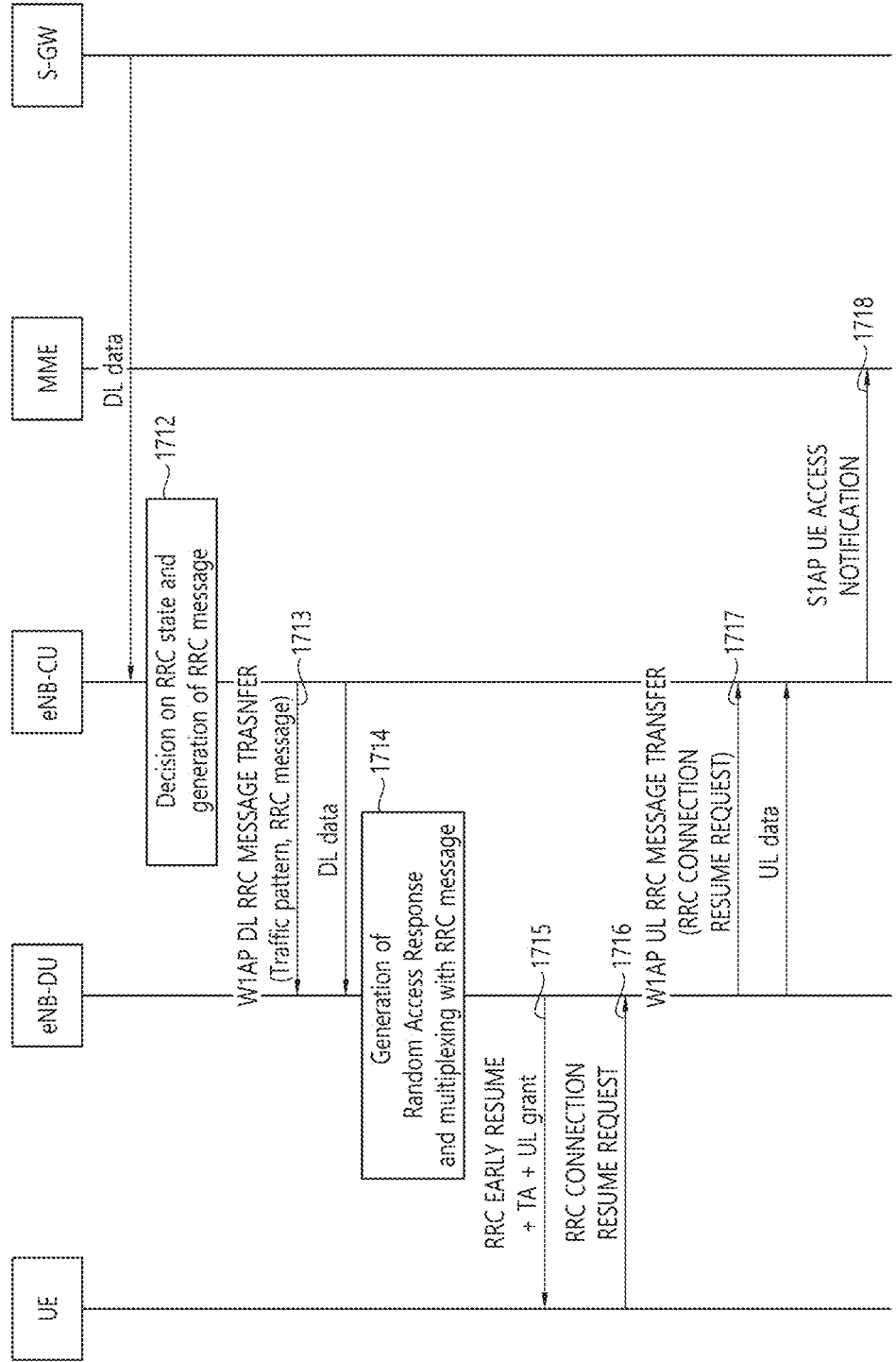

FIGS. 17A and 17B show an example of a procedure for Msg2-based UP MT-EDT without F1 UE Context Setup procedure in a wireless communication system according to some embodiments of the present disclosure.

For example, FIGS. 17A and 17B represent a wireless communication system including a UE, an eNB-DU, an eNB-CU, an MME, and an S-GW.

In step 1700, the UE may be in the RRC-IDLE with suspend. In this case, the UE may store the AS context and suspend all Signalling Radio Bearers (SRBs) and Data Radio Bearers (DRBs).

In step 1701, when the S-GW receives, from a core network, a single UP data to the UE, the S-GW may send the DL DATA NOTIFICATION message to the MME. This message may include the DL data size.

In step 1702, when the MME decides that the DL data can be transmitted using MT-EDT, the MME may initiate the MT-EDT to send a DL data.

In step 1703, the MME may sends the S1AP PAGING message including the MT-EDT indication to inform that the DL data can be transmitted using the MT-EDT. For example, the S1AP PAGING message may include the DL data size.

If the DL data size is provided in the S1AP PAGING message, the S1AP PAGING message may not include the MT-EDT indication.

For example, in the S1AP PAGING message, the Resume ID may be delivered to locate the old eNB and retrieve the UE context via the X2 interface.

In step 1704, the eNB-CU may send the W1AP PAGING message including the MT-EDT indication to inform that this data can be transmitted using MT-EDT. Based on the information, the eNB-DU can be also aware of initiating the Msg2-based MT-EDT procedure.

If the DL data size is provided in the W1AP PAGING message, it may not necessary to also include the MT-EDT indication.

To uniquely identify the UE association over the W1 interface within the eNB-CU, the eNB-CU UE W1AP ID may be included into the W1AP PAGING message. To quickly deliver the UL data from the eNB-DU to the eNB-CU, the eNB-CU may allocate the UL UP TNL Information in advance and forward the UL UP TNL Information to the eNB-DU in the W1AP PAGING message.

In step 1705, when the eNB-DU receives the MT-EDT indication and/or DL data size, the eNB-DU may allocate the CFRA Preamble and EDT-RNTI for MT-EDT. The CFRA preamble may be used for the UE to respond to the eNB for the PAGING message. In addition, the EDT-RNTI may be used to identify the UE in RANDOM ACCESS RESPONSE message.

In step 1706, the eNB-DU may send to the UE the Paging message including the CFRA Preamble and EDT-RNTI.

In step 1707, upon reception of the Paging message, the UE may use the preamble indicated by the Paging which in turn is used by the network to locate the UE for MT-EDT. When the UE sends the preamble indicated by the Paging, the eNB-DU may consider that the UE accesses to the eNB-DU for the Paging response.

If the DL data size is included into the W1AP PAGING message and the eNB-DU is able to know the actual CE level for the UE, the gNB-DU may decide whether the DL data could be transmitted using the MT-EDT.

In step 1708, the eNB-DU may send to the eNB-CU the W1AP UE ACCESS INDICATION message including the S-TMSI and eNB-DU UE W1AP ID to inform that the UE accesses to the eNB-DU for the paging response and MT-EDT.

The S-TMSI may be used to identify the UE in the eNB-CU. If the eNB-CU UE W1AP ID is included into the W1AP PAGING message in step 1704, it is also included into this message.

The eNB-DU UE W1AP ID may be used to identify the UE association over the W1 interface within the eNB-DU. If the eNB-DU is able to know the actual CE level for the UE based on the preamble sent by the UE, the transport block size may be included into this message.

The eNB-DU may allocate DL UP TNL Information to deliver the DL data from the eNB-CU.

On reception of the W1AP UE ACCESS INDICATION message from the eNB-DU, the eNB-CU may find the UE context and verify the UE identity. If there is no UE context for the UE identity, the eNB-CU may retrieve the UE context from the old eNB by using the Resume ID received in step 1703.

Since multiple fake UEs (attackers) may respond to the paging message, the same eNB-CU UE W1AP ID received in step 1704 may be used to identify the UE in eNB-CU. In this case, the S-TMSI could be used to identify the UE in eNB-CU.

In step 1709, when the DL data size is smaller than the transport block size for the MT-EDT, the eNB-CU may send the S1AP UE CONTEXT RESUME REQUEST message to indicate the UE's access and to request the S1 connection resumption and the delivery of the DL data.

In step 1710, the MME may request the S-GW to activate the S1-U bearers for the UE.

In step 1711, the MME may respond to the eNB-CU with the S1AP UE CONTEXT RESUME RESPONSE message. This message may also contain the traffic pattern to indicate whether there is no subsequent uplink and/or downlink data or not. This traffic pattern may be included into the S1AP PAGING message in step 1703.

The DL data may be sent from the S-GW to the eNB-CU.

In step 1712, based on the DL data size, traffic pattern, transport block size, and so on, the eNB-CU may decide the actual RRC state for the UE. If the eNB-CU decides to send back the UE to the RRC-IDLE with suspend and there is no uplink data from the UE, the eNB-CU may generate the RRC CONNECTION RELEASE message or new message including the NCC and Resume ID which is used for the next EDT. If the eNB-CU decides to send back the UE to the RRC-IDLE with suspend and there is a single uplink data from the UE, the eNB-CU may generate the RRC EARLY RESUME message or new message to deliver the DL data.

In step 1713, the eNB-CU may send to the eNB-DU the W1AP DL RRC MESSAGE TRANSFER message including the RRC message generated by the eNB-CU. This message may also contain the additional information (for example, traffic pattern, UE's expected behaviour, Release Assistance Information) to indicate whether there is no subsequent uplink and/or downlink data or not. This traffic pattern may be included into the W1AP PAGING message in step 1704. The eNB-CU may indicate to the eNB-DU the information on which RRC state is decided for the UE.

If the UL UP TNL Information is not delivered in step 1704, the UL UP TNL Information may be included into this message.

The DL data may be sent from the eNB-CU to the eNB-DU.

In step 1714, when the eNB-DU receives, from the eNB-CU, the W1AP DL RRC MESSAGE TRANSFER message, the eNB-DU may generate the RANDOM ACCESS RESPONSE message including the Timing Alignment information and the UL grant. Then, the RANDOM ACCESS RESPONSE message may be multiplexed with the DL data and the RRC message which are received in step 1713.

In step 1715, if there is a single UL data from the UE, the eNB-DU may send to the UE the RANDOM ACCESS RESPONSE message multiplexed with RRC EARLY RESUME message and the DL data.

In step 1716, the UE may respond to the eNB with the RRC CONNECTION RESUME REQUEST message or new message. This message may contain the UL data.

In step 1717, the eNB-DU may forward to the eNB-CU the RRC CONNECTION RESUME REQUEST message or new message by using the W1AP UL RRC MESSAGE TRANSFER message. Then, the UL data may be forwarded to the eNB-CU.

In step 1718, the eNB-CU may send the S1AP UE ACCESS NOTIFICATION message or new message to indicate that the MT-EDT is successfully delivered to the UE.

Figure 18A:
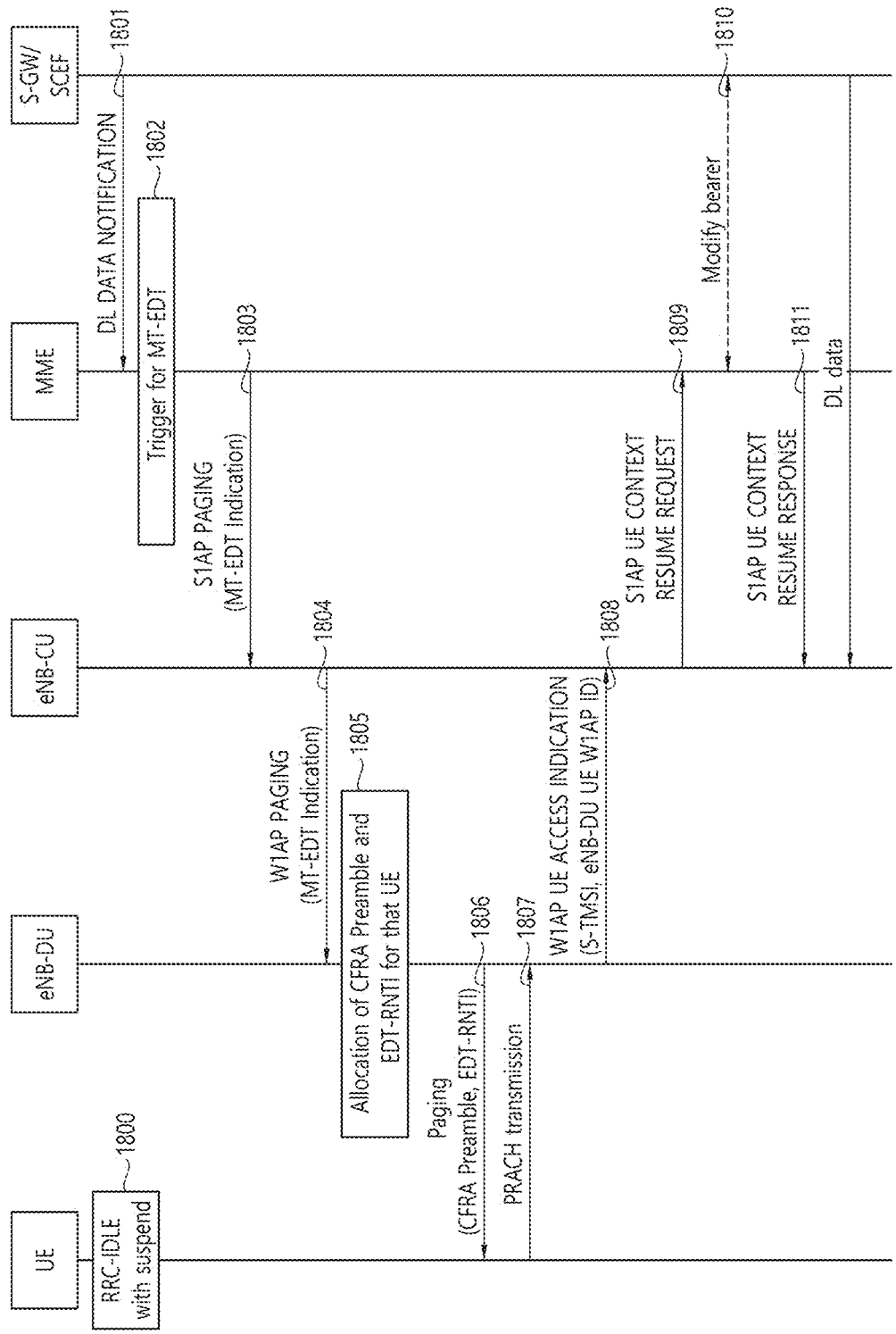
FIGS. 18A and 18B show an example of a procedure for Msg2-based UP MT-EDT with F1 UE Context Setup procedure in a wireless communication system according to some embodiments of the present disclosure.
Figure 18B:
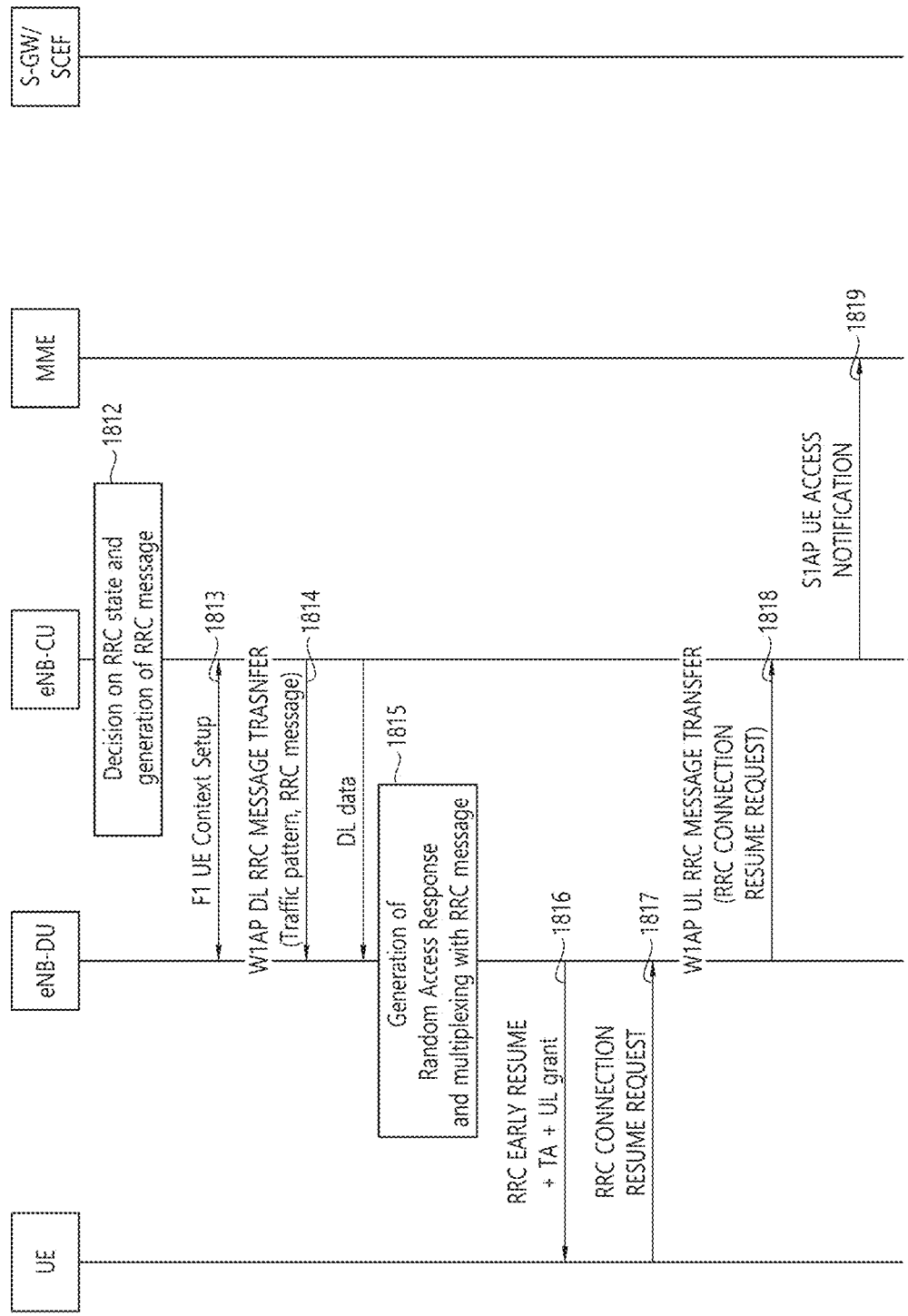

FIGS. 18A and 18B show an example of a procedure for Msg2-based UP MT-EDT with F1 UE Context Setup procedure in a wireless communication system according to some embodiments of the present disclosure.

For example, FIGS. 18A and 18B represent a wireless communication system including a UE, an eNB-DU, an eNB-CU, an MME, and an S-GW/SCEF.

In step 1800, the UE may be in the RRC-IDLE with suspend. In this case, the UE may store the AS context and suspend all SRBs and DRBs.

In step 1801, when the S-GW receives, from a core network, a single UP data to be transmitted to the UE, the S-GW send may the DL DATA NOTIFICATION message to the MME. The DL DATA NOTIFICATION message may include the DL data size.

In step 1802, when the MME decides that a DL data can be transmitted using MT-EDT, the MME may initiate MT-EDT to send the DL data.

In step 1803, the MME may send the S1AP PAGING message including the MT-EDT indication to inform that the DL data can be transmitted using MT-EDT. If the DL data size is provided in the S1AP PAGING message, it is not necessary to also include the MT-EDT indication.

In the S1AP PAGING message, the Resume ID may be delivered to locate the old eNB and retrieve the UE context via the X2 interface.

In step 1804, the eNB-CU may send the W1AP PAGING message including the MT-EDT indication to inform that this data can be transmitted using MT-EDT. Based on this information, the eNB-DU can be also aware of initiating the Msg2-based MT-EDT solution.

If the DL data size is provided in the W1AP PAGING message, it is not necessary to also include the MT-EDT indication.

To uniquely identify the UE association over the W1 interface within the eNB-CU, the eNB-CU UE W1AP ID may be included into the W1AP PAGING message.

In step 1805, when receiving the MT-EDT indication or DL data size, the eNB-DU may allocate the CFRA Preamble and EDT-RNTI for MT-EDT. The CFRA preamble may be used for the UE to respond to the eNB for the PAGING message. In addition, the EDT-RNTI may be used to identify the UE in RANDOM ACCESS RESPONSE message.

In step 1806, the eNB-DU may send to the UE the Paging message including the CFRA Preamble and EDT-RNTI.

In step 1807, upon reception of the Paging message, the UE may use the preamble indicated by the Paging which in turn is used by the network to locate the UE for MT-EDT. When the UE sends the preamble indicated by the Paging, the eNB-DU may consider that the UE accesses to the eNB-DU for the Paging response.

If the DL data size is included into the W1AP PAGING message and the eNB-DU is able to know the actual CE level for the UE, the gNB-DU may decide whether the DL data can be transmitted using the MT-EDT.

In step 1808, the eNB-DU may send to the eNB-CU the W1AP UE ACCESS INDICATION message including the S-TMSI and eNB-DU UE W1AP ID to inform that the UE accesses to the eNB-DU for the paging response and MT-EDT.

The S-TMSI may be used to identify the UE in the eNB-CU. If the eNB-CU UE W1AP ID is included into the W1AP PAGING message in step 1804, the eNB-CU UE W1AP ID may be included into the W1AP UE ACCESS INDICATION message. The eNB-DU UE W1AP ID may be used to identify the UE association over the W1 interface within the eNB-DU. If the eNB-DU is able to know the actual CE level for the UE based on the preamble sent by the UE, the transport block size may be included into this message.

Upon reception of this message from the eNB-DU, the eNB-CU may find the UE context and verify the UE identity. If there is no UE context for the UE identity, the eNB-CU may retrieve the UE context from the old eNB by using the Resume ID received in step 1803.

Since multiple fake UEs (attackers) may respond to the paging message, the same eNB-CU UE W1AP ID received in step 1804 may be used to identify the UE in eNB-CU. In this case, the S-TMSI can be used to identify the UE in eNB-CU.

In step 1809, when the DL data size is smaller than the transport block size for the MT-EDT, the eNB-CU may send the S1AP UE CONTEXT RESUME REQUEST message to indicate the UE's access and to request the S1 connection resumption and the delivery of the DL data.

In step 1810, the MME may request the S-GW to activate the S1-U bearers for the UE.

In step 1811, the MME may respond to the eNB-CU with the S1AP UE CONTEXT RESUME RESPONSE message. This message may also contain the traffic pattern to indicate whether there is no subsequent uplink and/or downlink data or not. This traffic pattern may be included into the S1AP PAGING message in step 1803.

The DL data may be sent to the eNB-CU from the MME.

In step 1812, based on the DL data size, traffic pattern, transport block size, and so on, the eNB-CU may decide the actual RRC state for the UE. If the eNB-CU decides to send back the UE to the RRC-IDLE with suspend and there is no uplink data from the UE, the eNB-CU may generate RRC CONNECTION RELEASE message or new message including the NCC and Resume ID which is used for the next EDT. If the eNB-CU decides to send back the UE to the RRC-IDLE with suspend and there is a single uplink data from the UE, the eNB-CU may generate the RRC EARLY RESUME message or new message to deliver the DL data.

In step 1813, the eNB-CU may initiate the F1 UE Context Setup procedure to setup the UE context in eNB-DU. The DL/UL UP TNL Information may be exchanged between the eNB-DU and the eNB-CU.

In step 1814, the eNB-CU may send to the eNB-DU the W1AP DL RRC MESSAGE TRANSFER message including the RRC message generated by the eNB-CU. This message may also contain the additional information (for example, traffic pattern, UE's expected behaviour, Release Assistance Information) to indicate whether there is no subsequent uplink and/or downlink data or not. The traffic pattern may be included into the W1AP PAGING message in step 1804. The eNB-CU may indicate to the eNB-DU the information on which RRC state is decided for the UE.

The DL data may be sent to the eNB-DU from the eNB-CU.

In step 1815, when receiving the message from the eNB-CU, the eNB-DU may generate the RANDOM ACCESS RESPONSE message including the Timing Alignment information and the UL grant. Then, the RANDOM ACCESS RESPONSE message may be multiplexed with the DL data and the RRC message which are received in step 1813.

In step 1816, if there is a single UL data from the UE, the eNB-DU may send to the UE the RANDOM ACCESS RESPONSE message multiplexed with RRC EARLY RESUME message and the DL data.

In step 1817, the UE may respond to the eNB with the RRC CONNECTION RESUME REQUEST message or new message. This message may contain the UL data.

In step 1818, the eNB-DU may forward to the eNB-CU the RRC CONNECTION RESUME REQUEST message or new message by using the W1AP UL RRC MESSAGE TRANSFER message. Then, the UL data may be forwarded to the eNB-CU.

In step 1819, the eNB-CU may send the S1AP UE ACCESS NOTIFICATION message or new message to indicate that the MT-EDT is successfully delivered to the UE.

Figure 19A:
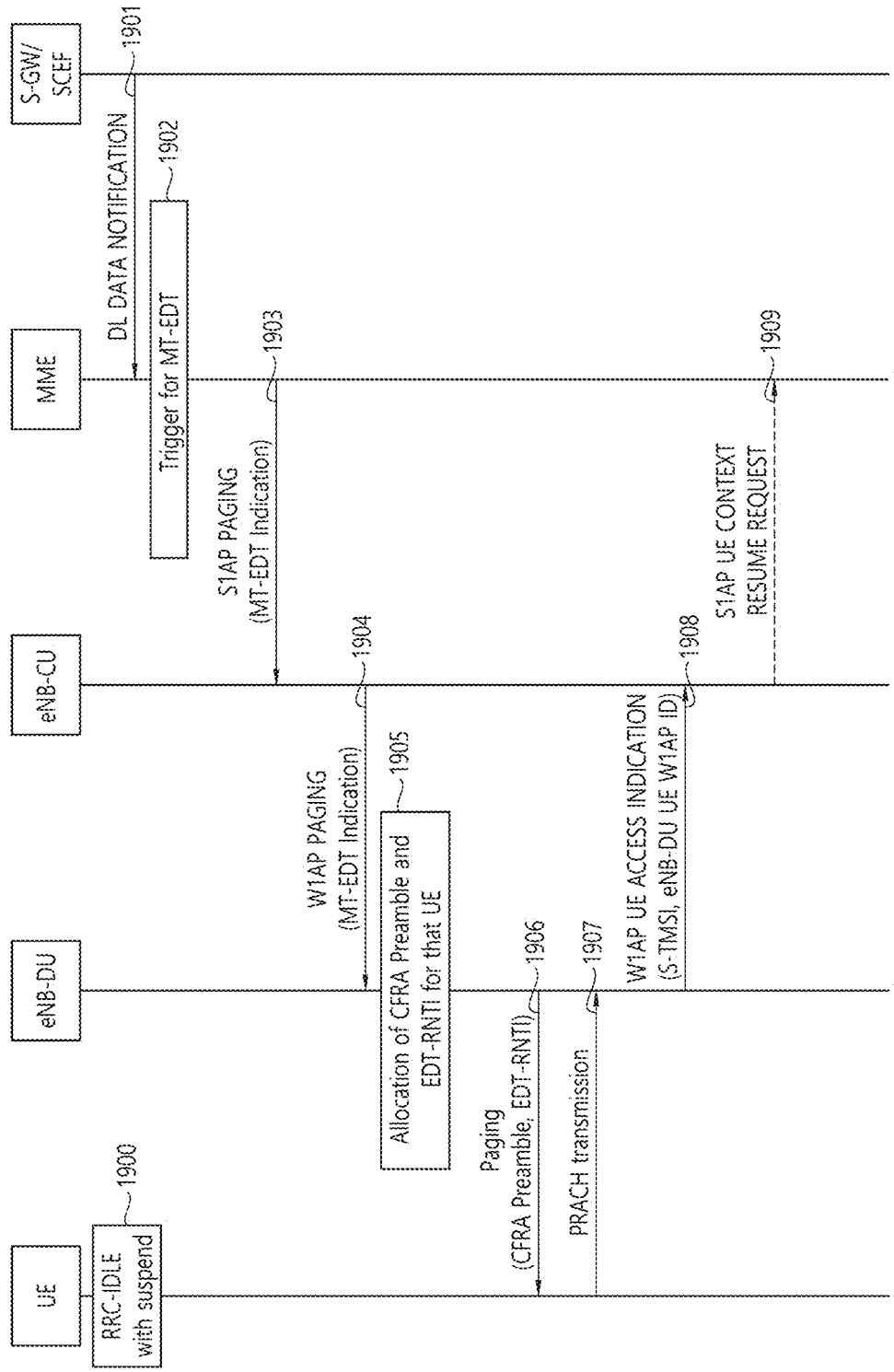
FIGS. 19A and 19B show an example of procedure to handle the failure case in Msg2-based UP MT-EDT in a wireless communication system according to some embodiments of the present disclosure.
Figure 19B:
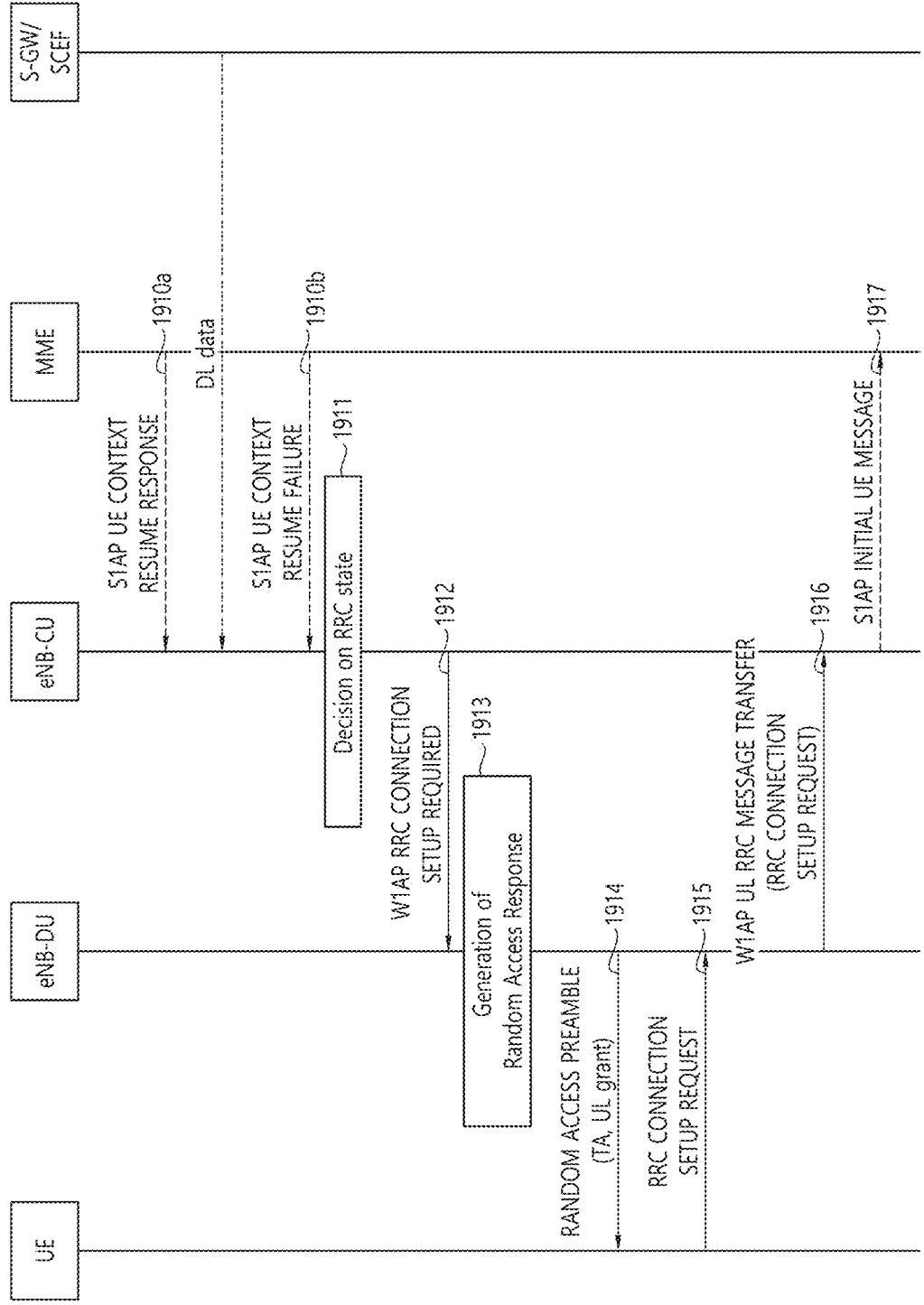

FIGS. 19A and 19B show an example of procedure to handle the failure case in Msg2-based UP MT-EDT in a wireless communication system according to some embodiments of the present disclosure.

For example, FIGS. 19A and 19B represent a wireless communication system including a UE, an eNB-DU, an eNB-CU, an MME, and an S-GW/SCEF.

In step 1900, the UE may be in the RRC-IDLE with suspend. In this case, the UE may store the AS context and suspend all SRBs and DRBs.

In step 1901, when the S-GW receives, from a core network, a single UP data to be transmitted to the UE, the S-GW may send the DL DATA NOTIFICATION message to the MME. This message may include the DL data size.

In step 1902, when the MME decides that the DL data can be transmitted using MT-EDT, the MME may initiate the MT-EDT to send a DL data.

In step 1903, the MME may send the S1AP PAGING message including the MT-EDT indication to inform that this data can be transmitted using MT-EDT. If the DL data size is provided in the S1AP PAGING message, it is not necessary to also include the MT-EDT indication.

In the S1AP PAGING message, the Resume ID may be delivered to locate the old eNB and retrieve the UE context via the X2 interface.

In step 1904, the eNB-CU may send the W1AP PAGING message including the MT-EDT indication to inform that this data can be transmitted using MT-EDT. Based on this information, the eNB-DU can be also aware of initiating the Msg2-based MT-EDT solution.

If the DL data size is provided in the W1AP PAGING message, it is not necessary to also include the MT-EDT indication.

To uniquely identify the UE association over the W1 interface within the eNB-CU, the eNB-CU UE W1AP ID may be included into the W1AP PAGING message.

In step 1905, when receiving the MT-EDT indication or DL data size, the eNB-DU may allocate the CFRA Preamble and EDT-RNTI for MT-EDT.

The CFRA preamble may be used for the UE to respond to the eNB for the PAGING message. In addition, the EDT-RNTI may be used to identify the UE in RANDOM ACCESS RESPONSE message.

In step 1906, the eNB-DU may send to the UE the Paging message including the CFRA Preamble and the EDT-RNTI.

In step 1907, upon reception of the Paging message, the UE may use the preamble indicated by the Paging which in turn is used by the network to locate the UE for the MT-EDT. When the UE sends the preamble indicated by the Paging, the eNB-DU may consider that the UE accesses to the eNB-DU for the Paging response.

If the DL data size is included into the W1AP PAGING message and the eNB-DU is able to know the actual CE level for the UE, the gNB-DU may decide whether the DL data can be transmitted using the MT-EDT.

In step 1908, the eNB-DU may send to the eNB-CU the W1AP UE ACCESS INDICATION message including the S-TMSI and eNB-DU UE W1AP ID to inform that the UE accesses to the eNB-DU for the paging response and the MT-EDT.

The S-TMSI may be used to identify the UE in the eNB-CU.

If the eNB-CU UE W1AP ID is included into the W1AP PAGING message in step 1904, the eNB-CU UE W1AP ID is also included into the W1AP UE ACCESS INDICATION message. The eNB-DU UE W1AP ID may be used to identify the UE association over the W1 interface within the eNB-DU.

If the eNB-DU is able to know the actual CE level for the UE based on the preamble sent by the UE, the transport block size may be included into the W1AP UE ACCESS INDICATION message.

On reception of this message from the eNB-DU, the eNB-CU may find the UE context and verify the UE identity. If there is no UE context for the UE identity, the eNB-CU may retrieve the UE context from the old eNB by using the Resume ID received in step 1903.

Since multiple fake UEs (attackers) may respond to the paging message, the same eNB-CU UE W1AP ID received in step 1904 may be used to identify the UE in eNB-CU. In this case, the S-TMSI can be used to identify the UE in the eNB-CU.

In step 1909, when the DL data size is smaller than the transport block size for the MT-EDT, the eNB-CU may send the S1AP UE CONTEXT RESUME REQUEST message to indicate the UE's access and to request the S1 connection resumption and the delivery of the DL data.

If the eNB-CU fails to retrieve the UE context from the old eNB in step 1908, the eNB-CU may skip the S1 UE Context Resume procedure and then perform step 1911 below.

In step 1910, before the MME responds to the eNB-CU with the S1AP UE CONTEXT RESUME RESPONSE message, the MME may request the S-GW to activate the S1-U bearers for the UE. Then, the DL data may be sent to the eNB-CU.

If the MME fails to resume the S1 connection, the MME may respond to the eNB-CU with the S1AP UE CONTEXT RESUME FAILURE message.

In step 1911, based on the DL data size, traffic pattern, transport block size, and so on, the eNB-CU may decide the actual RRC state for the UE.

If the eNB-CU decides to send back the UE to the RRC-IDLE, the eNB-CU may generate the RRC CONNECTION RELEASE message or new message including the NCC and Resume ID which is used for the next EDT.

If the eNB-CU decides to send back the UE to the RRC-CONNECTED with a new RRC and S1 connection, the eNB-CU may request to the eNB-DU the establishment of RRC connection.

If the eNB-CU decides to send back the UE to the RRC-CONNECTED with a resumption of RRC connection and no MT-EDT, the eNB-CU may request to the eNB-DU the resumption of RRC connection without MT-EDT by using the RRC CONNECTION RESUME message.

In step 1912, when the eNB-CU decides to send back the UE to the RRC-CONNECTED state with a new RRC and S1 connection, the eNB-CU may send the W1AP RRC CONNECTION SETUP REQUIRED message or new message to request the establishment of RRC connection.

When the eNB-CU decides to send back the UE to the RRC-CONNECTED with a resumption of RRC connection and no MT-EDT, the W1AP RRC CONNECTION SETUP REQUIRED message may include the RRC CONNECTION RESUME message to inform of resuming the RRC connection without the MT-EDT.

In step 1913, based on the message in step 1912, the eNB-DU may be aware of establishing a new RRC connection for the UE instead of resuming it. Therefore, the eNB-DU may generate the RANDOM ACCESS RESPONSE message including the information for Msg3 (for example, TA, UL grant, and so on).

If the resumption of RRC connection with no MT-EDT is decided in step 1911, the RRC CONNECTION RESUME message may be multiplexed with the RANDOM ACCESS PREAMBLE message to request to the UE the resumption of the RRC connection without a MT-EDT. In this case, the eNB-DU may use a legacy RANDOM ACCESS RESPONSE message.

In step 1914, the eNB-DU may send to the UE the RANDOM ACCESS RESPONSE message.

In the step 1915, according to the instruction from the eNB, the UE may respond to the eNB with the RRC CONNECTION SETUP REQUEST message to establish a new RRC connection or the RRC CONNECTION RESUME REQUEST message to resume the existing RRC connection.

In step 1916, the eNB-DU may forward to the eNB-CU the RRC CONNECTION SETUP REQUEST message or the RRC CONNECTION RESUME REQUEST message by using the W1AP UL RRC MESSAGE TRANSFER message.

In step 1917, if the S1 connection should be established newly, the eNB-CU may initiate the S1 Initial UE Message procedure to establish a S1 connection.

According to some embodiments of the present disclosure described with reference to FIGS. 15 to 19, the eNB-CU could decide the exact RRC state based on the information from the eNB-DU and the core network (for example, the MME) in Msg2-based MT-EDT procedure. When the Msg2-based MT-EDT procedure is failed, the eNB-CU could efficiently manage the RRC state for the UE without unnecessary signalling between the eNB-DU and the eNB-CU.

Hereinafter, an example of a method for support of CU-DU split during the Random Access procedure in Msg4 based CP/UP MT-EDT in a wireless communication system, according to some embodiments of the present disclosure, will be described.

In this example, the DU may check, to the CU, whether the MT-EDT is triggered or not.

Figure 20B:
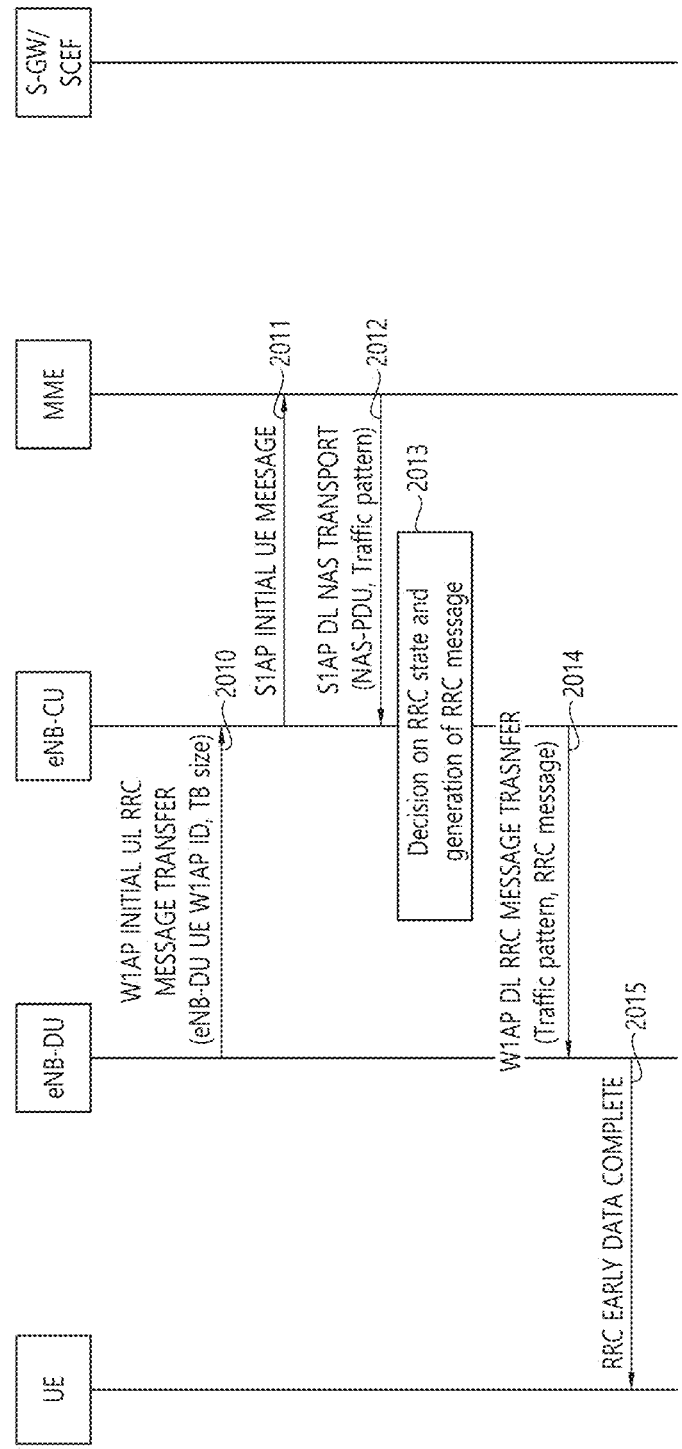

FIGS. 20A and 20B show an example of a Msg4-based CP MT-EDT procedure in a wireless communication system according to some embodiments of the present disclosure.

For example, FIGS. 20A and 20B represent a wireless communication system including a UE, an eNB-DU, an eNB-CU, an MME, and an S-GW/SCEF.

In step 2001, when the S-GW or SCEF receives, from a core network, a single CP data to be transmitted to the UE, the S-GW or SCEF may forward the single CP data to the MME.

In step 2002, when the MME decides that a DL data can be transmitted using MT-EDT, the MME may initiate the MT-EDT to send the DL data.

In step 2003, the MME may send the S1AP PAGING message including the MT-EDT indication to inform that the DL data can be transmitted using the MT-EDT. If the DL data size is provided in the S1AP PAGING message, it is not necessary to also include the MT-EDT indication.

In step 2004, the eNB-CU may send the W1AP PAGING message including the MT-EDT indication to inform that the DL data can be transmitted using the MT-EDT. Based on this information, the eNB-DU can be also aware of initiating the MT-EDT procedure.

If the DL data size is provided in the W1AP PAGING message, it is not necessary to also include the MT-EDT indication.

To uniquely identify the UE association over the W1 interface within the eNB-CU, the eNB-CU UE W1AP ID may be included into the W1AP PAGING message.

In step 2005, the eNB-DU may send to the UE the Paging message.

In step 2006, upon reception of the Paging message, the UE may respond to the eNB with the RANDOM ACCESS PREAMBLE message.

In step 2007, if the DL data size is not included in the W1AP PAGING message in step 2004, the eNB-DU may send to the eNB-CU the MT-EDT CHECK REQUEST message or new message including the S-TMSI and transport block size to query whether the DL data size is smaller than the TB size and whether the MT-EDT can be used for the UE.

When the DL data size is also not available in the eNB-CU, the eNB-CU may query it to the MME.

The eNB-CU may send to the eNB-DU the W1AP MT-EDT CHECK RESPONSE including the S-TMSI and the check result.

According to some embodiments of the present disclosure, instead of step 2007, the eNB-DU may forward the TB size to the eNB-CU in step 2010.

Since multiple fake UEs (attackers) may respond to the paging message, the same eNB-CU UE W1AP ID received in step 2004 may be used to identify the UE in eNB-CU. In this case, the S-TMSI can be used to identify the UE in eNB-CU.

In step 2008, the eNB-DU may send to the UE the RANDOM ACCESS RESPONSE message for the MT-EDT.

In step 2009, the UE may send RRC EARLY DATA REQUEST message concatenating the user data on CCCH.

In step 2010, the eNB-DU may forward the RRC message to the eNB-CU by using the W1AP INITIAL UL RRC MESSAGE TRANSFER message.

If the TB size is not delivered to the eNB-CU in step 2007 above, the TB size may be included into the W1AP INITIAL UL RRC MESSAGE TRANSFER message.

In step 2011, the eNB-CU may initiate the S1AP Initial UE Message procedure to forward the NAS message and establish the S1 connection. The eNB may indicate in this procedure that this connection is triggered for EDT. The MME may request the S-GW to re-activate the EPS bearers for the UE.

In step 2012, the MME may forward the data to the eNB via the S1AP DL NAS TRANSPORT message and may also indicate whether further data are expected by using the information such as End indication, Release Assistance Information, Traffic pattern, UE's Expected Behavior, and so on.

In step 2013, based on the DL data size, traffic pattern, transport block size, and so on, the eNB-CU may decide the actual RRC state for the UE.

If the eNB-CU decides to send back the UE to the RRC-IDLE with suspend and there is no uplink data from the UE, the eNB-CU may generate the RRC CONNECTION RELEASE message or new message including the NCC which is used for the next EDT.

If the eNB-CU decides to send back the UE to the RRC-IDLE with suspend and there is a single uplink data from the UE, the eNB-CU may generate the RRC EARLY DATA COMPLETE message or new message to deliver the DL data.

In step 2014, the eNB-CU may send to the eNB-DU the W1AP DL RRC MESSAGE TRANSFER message including the RRC message generated by the eNB-CU.

The W1AP DL RRC MESSAGE TRANSFER message may also contain the additional information (for example, traffic pattern, UE's expected behavior, Release Assistance Information) to indicate whether there is no subsequent uplink and/or downlink data or not. This traffic pattern may be included into the W1AP PAGING message in step 2004. The eNB-CU may indicate to the eNB-DU the information on which RRC state is decided for the UE.

In step 2015, the eNB-DU may send to the UE the RRC EARLY DATA COMPLETE message.

Figure 21A:
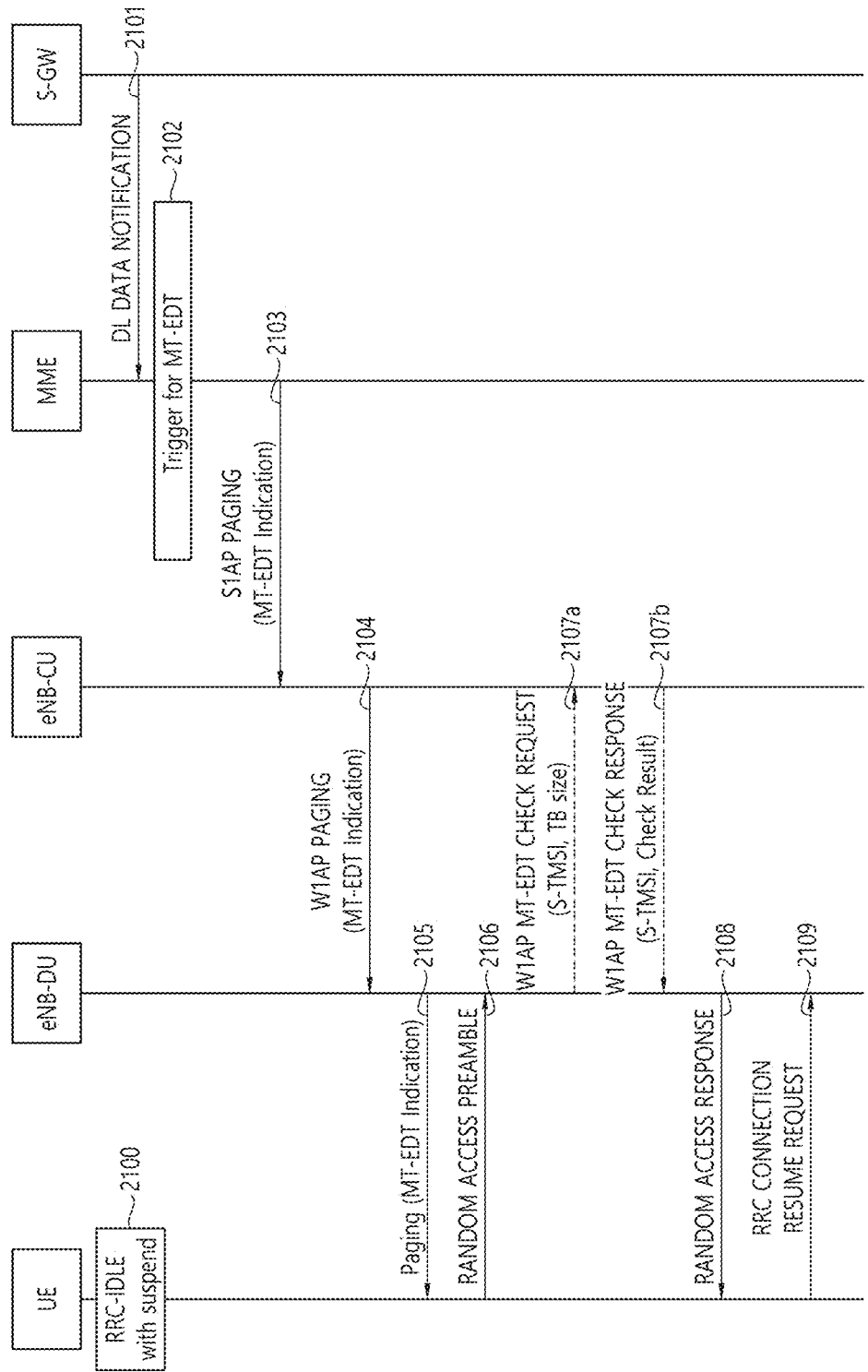
FIGS. 21A and 21B show an example of a Msg4-based UP MT-EDT procedure in a wireless communication system according to some embodiments of the present disclosure.
Figure 21B:
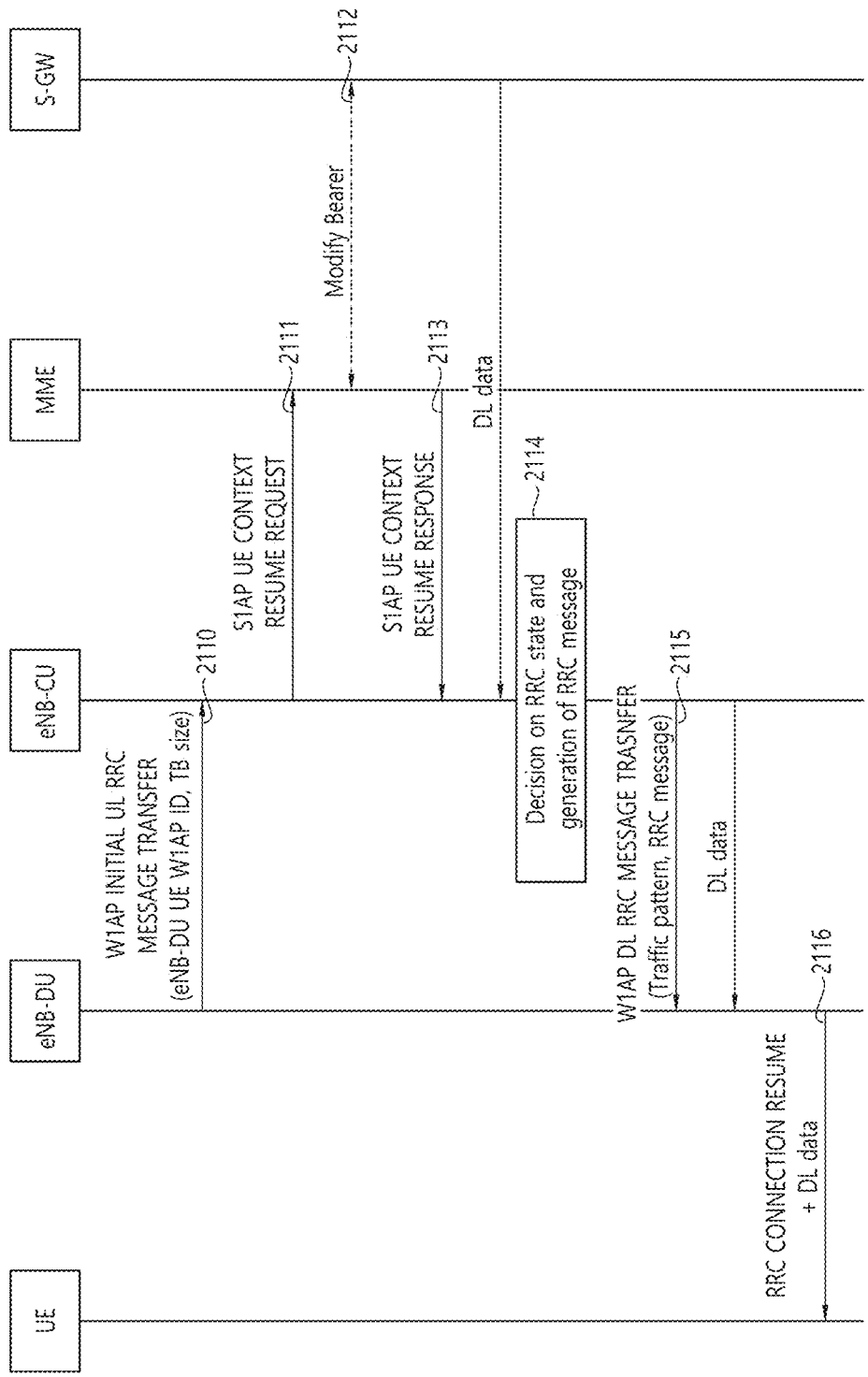

FIGS. 21A and 21B show an example of a Msg4-based UP MT-EDT procedure in a wireless communication system according to some embodiments of the present disclosure.

For example, FIGS. 21A and 21B represent a wireless communication system including a UE, an eNB-DU, an eNB-CU, an MME, and an S-GW.

In step 2100, the UE may be in the RRC-IDLE with suspend. In this case, the UE may store the AS context and suspend all SRBs and DRBs.

In step 2101, when the S-GW receives, from a core network, a single UP data to be transmitted to the UE, the S-GW may send the DL DATA NOTIFICATION message to the MME. The DL DATA NOTIFICATION message may include the DL data size.

In step 2102, when the MME decides that the single UP data (for example, a DL data) can be transmitted using MT-EDT, the MME may initiate the MT-EDT to send the DL data.

In step 2103, the MME may send the S1AP PAGING message including the MT-EDT indication to inform that the DL data can be transmitted using MT-EDT. If the DL data size is provided in the S1AP PAGING message, it is not necessary to also include the MT-EDT indication.

In step 2104, the eNB-CU may send the W1AP PAGING message including the MT-EDT indication to inform that the DL data can be transmitted using MT-EDT. Based on this information, the eNB-DU can be also aware of initiating the MT-EDT procedure.

If the DL data size is provided in the W1AP PAGING message, it is not necessary to also include the MT-EDT indication.

To uniquely identify the UE association over the W1 interface within the eNB-CU, the eNB-CU UE W1AP ID may be included into the W1AP PAGING message.

In step 2105, the eNB-DU may send to the UE the Paging message.

In step 2106, upon reception of the Paging message, the UE may respond to the eNB with the RANDOM ACCESS PREAMBLE message.

In step 2107, if the DL data size is not included in the W1AP PAGING message in step 2104, the eNB-DU may send to the eNB-CU the MT-EDT CHECK REQUEST message or new message including the S-TMSI and transport block size to query whether the DL data size is smaller than the TB size and whether the MT-EDT can be used for the UE.

When the DL data size is also not available in the eNB-CU, the eNB-CU may query it to the MME.

The eNB-CU may send to the eNB-DU the W1AP MT-EDT CHECK RESPONSE including the S-TMSI and the check result.

According to some embodiments of the present disclosure, instead of step 2107, the eNB-DU may forward the TB size to the eNB-CU in step 2110.

Since multiple fake UEs (attackers) may respond to the paging message, the same eNB-CU UE W1AP ID received in step 2104 may be used to identify the UE in eNB-CU. In this case, the S-TMSI can be used to identify the UE in the eNB-CU.

In step 2108, the eNB-DU may send to the UE the RANDOM ACCESS RESPONSE message for MT-EDT.

In step 2109, the UE may send RRC EARLY DATA REQUEST message concatenating the user data on CCCH.

In step 2110, the eNB-DU may forwards the RRC message to the eNB-CU by using the W1AP INITIAL UL RRC MESSAGE TRANSFER message. If the TB size is not delivered to the eNB-CU in step 2107, the TB size may be included into the W1AP INITIAL UL RRC MESSAGE TRANSFER message.

In step 2111, the eNB-CU may initiate the S1AP UE Context Resume procedure to resume the S1 connection and re-activate the S1-U bearers.

In step 2112, the MME may request the S-GW to re-activate the S1-U bearers for the UE.

In step 2113, the MME may confirm the UE context resumption to the eNB and may also indicate whether further data are expected by using the information such as End indication, Release Assistance Information, Traffic pattern, UE's Expected Behavior, and so on.

The S-GW may send the downlink data to the eNB.

In step 2114, based on the DL data size, traffic pattern, transport block size, and so on, the eNB-CU may decide the actual RRC state for the UE.

If the eNB-CU decides to send back the UE to the RRC-IDLE with suspend and there is no uplink data from the UE, the eNB-CU may generate the RRC CONNECTION RELEASE message or new message including the NCC which is used for the next EDT.

If the eNB-CU decides to send back the UE to the RRC-IDLE with suspend and there is a single uplink data from the UE, the eNB-CU may generate the RRC CONNECTION RESUME message or new message to deliver the DL data.

In step 2115, the eNB-CU may send to the eNB-DU the W1AP DL RRC MESSAGE TRANSFER message including the RRC message generated by the eNB-CU. The W1AP DL RRC MESSAGE TRANSFER message may also contain the additional information (for example, traffic pattern, UE's expected behavior, Release Assistance Information) to indicate whether there is no subsequent uplink and/or downlink data or not.

The traffic pattern may be included into the W1AP PAGING message in step 2104. The eNB-CU may indicate to the eNB-DU the information on which RRC state is decided for the UE.

The DL data may be sent to the eNB-DU.

In step 2116, the eNB-DU may send to the UE the RRC CONNECTION RESUME message with DL data.

According to some embodiments of the present disclosure described with reference to FIGS. 20 and 21, the eNB-CU could decide the exact RRC state based on the information from the eNB-DU and the MME in Msg4-based MT EDT procedure.

On the other hand, FIGS. 15 to 21 represent a method for support the MT-EDT procedure in CU-DU split for an eNB. However, it should be understood by those of ordinary skill in the art that the example of the method could be applied to the MT-EDT procedure in CU-DU split for the gNB. For example, the wireless communication system could include a gNB-DU, a gNB-CU, an Access and Mobility Management Function (AMF), and a 5G core network. For example, the gNB-DU may transmit, to the gNB-CU, the TB size and the gNB CU may decide whether to perform the MT-EDT procedure based on the received TB size.

Hereinafter, an apparatus for support of CU-DU split in MT-EDT procedure in a wireless communication system, according to some embodiments of the present disclosure, will be described.

For example, the gNB CU may include a processor, a memory, and a transceiver.

According to some embodiments of the present disclosure, the processor may be configured to be coupled operably with the memory and the transceiver.

The processor may be configured to control the transceiver to receive, from a Core Network (CN) node, a first message including first information related to a downlink (DL) data, wherein the DL data is to be transmitted to a wireless device. The processor may be configured to control the transceiver to transmit, to a Distributed Unit (DU) of the RAN node, a second message including an indication of an MT-EDT procedure. The processor may be configured to control the transceiver to receive, from the DU of the RAN node, second information related to a transport block used for the wireless device. The processor may be configured to decide a Radio Resource Control (RRC) state for transmitting the DL data to the wireless device based on the first information related to the DL data and the second information related to the transport block. The processor may be configured to generate a third message based on the decided RRC state. The processor may be configured to control the transceiver to transmit, to the DU of the RAN node, the generated third message.

According to some embodiments of the present disclosure, the first information related to the DL data may include a size of the DL data and the second information related to the transport block may include a size of the transport block.

For example, the processor may be configured to decide the RRC state as an RRC-IDLE state with suspend based on that the size of the DL data is less than or equal to the size of the transport block.

For example, the processor may be configured to decide the RRC state as an RRC-CONNECTED state based on that the size of the DL data is greater than the size of the transport block.

According to some embodiments of the present disclosure, the first information related to the DL data may include a size level of the DL data and the second information related to the transport block includes a size of the transport block. The size level of the DL data may include a maximum size of the DL data and a minimum size of the DL data.

For example, the processor may be configured to decide the RRC state as an RRC-IDLE state with suspend based on that the maximum size of the DL data is less than or equal to the size of the transport block.

For example, the processor may be configured to decide the RRC state as an RRC-CONNECTED state based on that the maximum size of the DL data is greater than the size of the transport block.

According to some embodiments of the present disclosure, the third message may include an RRC Connection Release message for the wireless device, based on that 1) the processor decides the RRC state as an RRC-IDLE state with suspend and 2) there is no uplink data from the wireless device.

According to some embodiments of the present disclosure, the third message may include an RRC Early Data Complete message for the wireless device, based on that 1) the processor decides the RRC state as an RRC-IDLE state with suspend and 2) there is a single uplink data from the wireless device.

According to some embodiments of the present disclosure, the third message may include an RRC Connection Resume message for the wireless device, based on that the processor decides the RRC state as an RRC-CONNECTED state.

According to some embodiments of the present disclosure, the RAN node may be an eNodeB (eNB). In this case, the first paging message may be an S1AP paging message.

According to some embodiments of the present disclosure, the RAN node may be a gNodeB (gNB). In this case, the first paging message may be an NGAP paging message.

For example, referring to FIG. 10, a gNB-CU could be an example of the CU for support of CU-DU split in MT-EDT procedure.

Hereinafter, a processor for a Central Unit (CU) for support of CU-DU split in MT-EDT procedure in a wireless communication system, according to some embodiments of the present disclosure, will be described.

The processor may be configured to control the CU to receive, from a Core Network (CN) node, a first message including first information related to a downlink (DL) data, wherein the DL data is to be transmitted to a wireless device. The processor may be configured to control the CU to transmit, to a Distributed Unit (DU) of the RAN node, a second message including an indication of an MT-EDT procedure. The processor may be configured to control the CU to receive, from the DU of the RAN node, second information related to a transport block used for the wireless device. The processor may be configured to control the CU to decide a Radio Resource Control (RRC) state for transmitting the DL data to the wireless device based on the first information related to the DL data and the second information related to the transport block. The processor may be configured to control the CU to generate a third message based on the decided RRC state. The processor may be configured to control the CU to control the transceiver to transmit, to the DU of the RAN node, the generated third message.

According to some embodiments of the present disclosure, the first information related to the DL data may include a size of the DL data and the second information related to the transport block may include a size of the transport block.

For example, the processor may be configured to control the CU to decide the RRC state as an RRC-IDLE state with suspend based on that the size of the DL data is less than or equal to the size of the transport block.

For example, the processor may be configured to control the CU to decide the RRC state as an RRC-CONNECTED state based on that the size of the DL data is greater than the size of the transport block.

According to some embodiments of the present disclosure, the first information related to the DL data may include a size level of the DL data and the second information related to the transport block includes a size of the transport block. The size level of the DL data may include a maximum size of the DL data and a minimum size of the DL data.

For example, the processor may be configured to control the CU to decide the RRC state as an RRC-IDLE state with suspend based on that the maximum size of the DL data is less than or equal to the size of the transport block.

For example, the processor may be configured to control the CU to decide the RRC state as an RRC-CONNECTED state based on that the maximum size of the DL data is greater than the size of the transport block.

According to some embodiments of the present disclosure, the third message may include an RRC Connection Release message for the wireless device, based on that 1) the CU of the RAN node decides the RRC state as an RRC-IDLE state with suspend and 2) there is no uplink data from the wireless device.

According to some embodiments of the present disclosure, the third message may include an RRC Early Data Complete message for the wireless device, based on that 1) the CU of the RAN node decides the RRC state as an RRC-IDLE state with suspend and 2) there is a single uplink data from the wireless device.

According to some embodiments of the present disclosure, the third message may include an RRC Connection Resume message for the wireless device, based on that the CU of the RAN node decides the RRC state as an RRC-CONNECTED state.

According to some embodiments of the present disclosure, the RAN node may be an eNodeB (eNB). In this case, the first paging message may be an S1AP paging message.

According to some embodiments of the present disclosure, the RAN node may be a gNodeB (gNB). In this case, the first paging message may be an NGAP paging message.

Hereinafter, a non-transitory computer-readable medium has stored thereon a plurality of instructions for support of CU-DU split in MT-EDT procedure in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Central Unit (CU).

The stored a plurality of instructions may cause the CU to receive, from a Core Network (CN) node, a first message including first information related to a downlink (DL) data, wherein the DL data is to be transmitted to a wireless device. The stored a plurality of instructions may cause the CU to transmit, to a Distributed Unit (DU) of the RAN node, a second message including an indication of an MT-EDT procedure. The stored a plurality of instructions may cause the CU to receive, from the DU of the RAN node, second information related to a transport block used for the wireless device. The stored a plurality of instructions may cause the CU to decide a Radio Resource Control (RRC) state for transmitting the DL data to the wireless device based on the first information related to the DL data and the second information related to the transport block. The stored a plurality of instructions may cause the CU to generate a third message based on the decided RRC state. The stored a plurality of instructions may cause the CU to control the transceiver to transmit, to the DU of the RAN node, the generated third message.

According to some embodiments of the present disclosure, the first information related to the DL data may include a size of the DL data and the second information related to the transport block may include a size of the transport block.

For example, the stored a plurality of instructions may cause the CU to decide the RRC state as an RRC-IDLE state with suspend based on that the size of the DL data is less than or equal to the size of the transport block.

For example, the stored a plurality of instructions may cause the CU to decide the RRC state as an RRC-CONNECTED state based on that the size of the DL data is greater than the size of the transport block.

According to some embodiments of the present disclosure, the first information related to the DL data may include a size level of the DL data and the second information related to the transport block includes a size of the transport block. The size level of the DL data may include a maximum size of the DL data and a minimum size of the DL data.

For example, the stored a plurality of instructions may cause the CU to decide the RRC state as an RRC-IDLE state with suspend based on that the maximum size of the DL data is less than or equal to the size of the transport block.

For example, the stored a plurality of instructions may cause the CU to decide the RRC state as an RRC-CONNECTED state based on that the maximum size of the DL data is greater than the size of the transport block.

According to some embodiments of the present disclosure, the third message may include an RRC Connection Release message for the wireless device, based on that 1) the CU of the RAN node decides the RRC state as an RRC-IDLE state with suspend and 2) there is no uplink data from the wireless device.

According to some embodiments of the present disclosure, the third message may include an RRC Early Data Complete message for the wireless device, based on that 1) the CU of the RAN node decides the RRC state as an RRC-IDLE state with suspend and 2) there is a single uplink data from the wireless device.

According to some embodiments of the present disclosure, the third message may include an RRC Connection Resume message for the wireless device, based on that the CU of the RAN node decides the RRC state as an RRC-CONNECTED state.

According to some embodiments of the present disclosure, the RAN node may be an eNodeB (eNB). In this case, the first paging message may be an S1AP paging message.

According to some embodiments of the present disclosure, the RAN node may be a gNodeB (gNB). In this case, the first paging message may be an NGAP paging message.

The present disclosure may have various advantageous effects.

According to some embodiments of the present disclosure described with reference to FIGS. 14 to 21, a CU of a RAN node could efficiently support of CU-DU split in MT-EDT procedure in a wireless communication system.

For example, a CU could decide the exact RRC state based on the information from a DU and a core network node in Msg2-based MT-EDT procedure.

For example, when the Msg2-based MT-EDT procedure is failed, a CU could efficiently manage the RRC state for a UE without unnecessary signalling between the DU and the CU.

For example, a CU could decide the exact RRC state based on the information from a DU and a core network node in Msg4-based MT EDT procedure.

For example, when the Msg4-based MT-EDT procedure is failed, a CU could efficiently manage the RRC state for a UE without unnecessary signalling between the DU and the CU.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a Central Unit (CU) of a Radio Access Network (RAN) node in a wireless communication system, the method comprising,
    receiving, from a Core Network (CN) node, a first message including first information related to a downlink (DL) data, wherein the DL data is to be transmitted to a wireless device;
    transmitting, to a Distributed Unit (DU) of the RAN node, a second message including an indication of an MT-EDT procedure;
    receiving, from the DU of the RAN node, second information related to a transport block used for the wireless device;
    deciding a Radio Resource Control (RRC) state for transmitting the DL data to the wireless device based on the first information related to the DL data and the second information related to the transport block;
    generating a third message based on the decided RRC state; and
    transmitting, to the DU of the RAN node, the generated third message.

2. The method of claim 1, wherein the first information related to the DL data includes a size of the DL data, and
    wherein the second information related to the transport block includes a size of the transport block.

3. The method of claim 2, wherein the CU of the RAN node decides the RRC state as an RRC-IDLE state with suspend based on that the size of the DL data is less than or equal to the size of the transport block.

4. The method of claim 2, wherein the CU of the RAN node decides the RRC state as an RRC-CONNECTED state based on that the size of the DL data is greater than the size of the transport block.

5. The method of claim 1, wherein the first information related to the DL data includes a size level of the DL data, which includes a maximum size of the DL data and a minimum size of the DL data, and
    wherein the second information related to the transport block includes a size of the transport block.

6. The method of claim 5, wherein the CU of the RAN node decides the RRC state as an RRC-IDLE state with suspend based on that the maximum size of the DL data is less than or equal to the size of the transport block.

7. The method of claim 5, wherein the CU of the RAN node decides the RRC state as an RRC-CONNECTED state based on that the maximum size of the DL data is greater than the size of the transport block.

8. The method of claim 1, wherein the third message includes an RRC Connection Release message for the wireless device, based on that 1) the CU of the RAN node decides the RRC state as an RRC-IDLE state with suspend and 2) there is no uplink data from the wireless device.

9. The method of claim 1, wherein the third message includes an RRC Early Data Complete message for the wireless device, based on that 1) the CU of the RAN node decides the RRC state as an RRC-IDLE state with suspend and 2) there is a single uplink data from the wireless device.

10. The method of claim 1, wherein the third message includes an RRC Connection Resume message for the wireless device, based on that the CU of the RAN node decides the RRC state as an RRC-CONNECTED state.

11. The method of claim 1, wherein the RAN node is an eNodeB (eNB).

12. The method of claim 11, wherein the first paging message is an S1AP paging message.

13. The method of claim 1, wherein the RAN node is a gNodeB (gNB).

14. The method of claim 13, wherein the first paging message is an NGAP paging message.

15. A Central Unit (CU) of a Radio Access Network (RAN) node in a wireless communication system comprising:
    a transceiver;
    a memory; and
    at least one processor operatively coupled to the transceiver and the memory, and configured to:
    control the transceiver to receive, from a Core Network (CN) node, a first message including first information related to a downlink (DL) data, wherein the DL data is to be transmitted to a wireless device;
    control the transceiver to transmit, to a Distributed Unit (DU) of the RAN node, a second message including an indication of an MT-EDT procedure;
    control the transceiver to receive, from the DU of the RAN node, second information related to a transport block used for the wireless device;
    decide a Radio Resource Control (RRC) state for transmitting the DL data to the wireless device based on the first information related to the DL data and the second information related to the transport block;
    generate a third message based on the decided RRC state; and
    control the transceiver to transmit, to the DU of the RAN node, the generated third message.

16. The CU of claim 15, wherein the first information related to the DL data includes a size of the DL data, and
    wherein the second information related to the transport block includes a size of the transport block.

17. The CU of claim 16, wherein the processor is configured to decide the RRC state as an RRC-IDLE state with suspend based on that the size of the DL data is less than or equal to the size of the transport block.

18. The CU of claim 16, wherein the processor is configured to decide the RRC state as an RRC-CONNECTED state based on that the size of the DL data is greater than the size of the transport block.

19. The CU of claim 15, wherein the first information related to the DL data includes a size level of the DL data, which includes a maximum size of the DL data and a minimum size of the DL data, and wherein the second information related to the transport block includes a size of the transport block.

20. A non-transitory computer-readable medium having stored thereon a plurality of instructions, which, when executed by a processor of a Central Unit (CU) of a Radio Access Network (RAN) node in a wireless communication system, cause the CU of the RAN node to:
receive, from a Core Network (CN) node, a first message including first information related to a downlink (DL) data, wherein the DL data is to be transmitted to a wireless device;
transmit, to a Distributed Unit (DU) of the RAN node, a second message including an indication of an MT-EDT procedure;
receive, from the DU of the RAN node, second information related to a transport block used for the wireless device;
decide a Radio Resource Control (RRC) state for transmitting the DL data to the wireless device based on the first information related to the DL data and the second information related to the transport block;
generate a third message based on the decided RRC state; and
transmit, to the DU of the RAN node, the generated third message.

* * * * *